US006559776B2

(12) United States Patent
Katz

(10) Patent No.: US 6,559,776 B2
(45) Date of Patent: *May 6, 2003

(54) PARKING STATUS CONTROL SYSTEM AND METHOD

(76) Inventor: Yoram Katz, 7 Monadnock Rd., Chestnut Hill, MA (US) 02467

( * ) Notice: Subject to any disclaimer, the term of this patent is extended or adjusted under 35 U.S.C. 154(b) by 0 days.

This patent is subject to a terminal disclaimer.

(21) Appl. No.: 09/990,672

(22) Filed: Nov. 14, 2001

(65) Prior Publication Data

US 2002/0109610 A1 Aug. 15, 2002

Related U.S. Application Data

(63) Continuation-in-part of application No. 09/784,519, filed on Feb. 15, 2001, now Pat. No. 6,344,806.

(51) Int. Cl.[7] .................................................. B60Q 1/48

(52) U.S. Cl. .................................... 340/932.2; 340/933

(58) Field of Search ............................. 340/932.4, 904, 340/933, 928, 938, 870.2, 870.7, 988, 991, 905, 932.2, 693.2, 693.9, 693.12; 235/384; 705/13; 368/90; 194/200, 217

(56) References Cited

U.S. PATENT DOCUMENTS

| | | | | | |
|---|---|---|---|---|---|
| 3,999,372 | A | | 12/1976 | Welch et al. | 58/142 |
| 4,043,117 | A | | 8/1977 | Maresca et al. | 58/142 |
| 4,310,890 | A | | 1/1982 | Trehn et al. | 364/467 |
| 4,379,334 | A | | 4/1983 | Feagins, Jr. et al. | 364/467 |
| 4,532,418 | A | | 7/1985 | Meese et al. | 235/381 |
| 4,823,928 | A | | 4/1989 | Speas | 194/217 |
| 4,880,097 | A | * | 11/1989 | Speas | 194/239 |
| 4,963,723 | A | | 10/1990 | Masada | 235/384 |
| 5,029,094 | A | | 7/1991 | Wong | 364/467 |
| 5,266,947 | A | * | 11/1993 | Fujiwara et al. | 340/932.2 |
| 5,310,999 | A | | 5/1994 | Claus et al. | 235/384 |
| 5,382,780 | A | | 1/1995 | Carmen | 235/384 |
| 5,432,508 | A | | 7/1995 | Jackson | 340/932.2 |
| 5,570,771 | A | | 11/1996 | Jacobs | 194/200 |
| 5,737,710 | A | | 4/1998 | Anthonyson | 701/1 |
| 5,751,973 | A | | 5/1998 | Hassett | 395/213 |
| 5,777,951 | A | | 7/1998 | Mitschele et al. | 368/90 |
| 5,805,082 | A | | 9/1998 | Hassett | 340/928 |
| 5,819,234 | A | | 10/1998 | Slavin et al. | 705/13 |
| 5,845,268 | A | | 12/1998 | Moore | 705/418 |
| 5,852,411 | A | * | 12/1998 | Jacobs et al. | 340/932.2 |
| 6,037,880 | A | | 3/2000 | Manion | 340/932.2 |
| 6,102,285 | A | | 8/2000 | Elias | 235/377 |
| 6,109,418 | A | | 8/2000 | Yost | 194/350 |
| 6,142,702 | A | | 11/2000 | Simmons | 404/6 |
| 6,195,015 | B1 | * | 2/2001 | Jacobs et al. | 340/693.9 |
| 6,240,365 | B1 | | 5/2001 | Bunn | 701/213 |
| 6,249,233 | B1 | | 6/2001 | Rosenberg et al. | 340/932.2 |
| 6,266,609 | B1 | | 7/2001 | Fasterrath | 701/200 |
| 6,289,315 | B1 | * | 9/2001 | Calvi | 705/1 |
| 6,292,110 | B1 | | 9/2001 | Budnovitch | 340/932.2 |
| 6,312,152 | B2 | * | 11/2001 | Dee et al. | 340/932.2 |
| 6,340,935 | B1 | * | 1/2002 | Hall | 340/932.2 |
| 6,373,401 | B2 | * | 4/2002 | Ho | 340/932.2 |
| 6,374,177 | B1 | * | 4/2002 | Lee et al. | 701/200 |

FOREIGN PATENT DOCUMENTS

JP 58-222369 12/1983

* cited by examiner

*Primary Examiner*—Van Trieu

(74) *Attorney, Agent, or Firm*—McDermott, Will & Emery

(57) ABSTRACT

A parking status control system and method allow a parking space, or plurality of parking spaces, to be automatically monitored to detect unauthorized occupancy. The system and method may be applied to metered parking spaces or to other situations where controlled access to a parking space or area is desired. The presence or lack of a vehicle in a monitored parking space is determined using a vehicle presence detector, which communicates a signal indicative of such presence to a central system. A user or vehicle based authorization module is configured to transmit an authorization input to facilitate automated satisfaction of a space authorization device, e.g., payment of a parking meter. If there is occupancy, but no proper authorization input, the central system declares a violation and communicates the violation to another system or individual charged with taking corrective action.

45 Claims, 14 Drawing Sheets

PARKING STATUS CONTROL SYSTEM AND METHOD

CROSS REFERENCE TO RELATED APPLICATIONS

This application is a continuation-in-part of commonly owned U.S. patent application Ser. No. 09/784,519, filed Feb. 15, 2001 now U.S. Pat. No. 6,344,806, and claims the benefit of priority therefrom.

FIELD OF THE INVENTION

The present invention generally relates to systems and methods used in conjunction with vehicle parking spaces. More specifically, the present invention relates to systems and methods for monitoring and controlling usage of such vehicle parking spaces.

BACKGROUND OF THE INVENTION

To an ever increasing degree there seems to be contention for space on today's roadways. To accommodate the steady growth in the population of vehicles, both personal and business vehicles, project after project is undertaken to expand and revamp the roadways, such as the multi-billion dollar "Big Dig" project in Massachusetts. Along with the vast number of vehicles on the roads, comes contention for parking spaces for those vehicles, primarily in urban and, increasingly, in suburban areas.

As with any resource that is in relatively short supply and high in demand, parking spaces frequently come at a cost. Typically, in an urban or suburban area, a city or town will provide metered public parking spaces. The parking meters accept coins in return for time on the meter, which is allowed time in the parking space associated with the meter. The typical parking meter allows a relatively short maximum amount of time for parking, e.g., a two hour limit, before the time on the meter expires. When the meter expires, the owner of a parked vehicle in the corresponding parking space is subject to a citation or parking ticket. As a result, if a vehicle owner wishes to park for an amount of time in excess of the meters limit, the vehicle owner must return to the meter and insert more coins before it expires. This tends, of course, to be very frustrating for the vehicle owner.

To ensure adherence to the requirement to pay for metered parking spaces or, in the alternative, to issue citations to violators, the city or town employs individuals (sometimes referred to as "meter maids") to go around the city or town and determine, on a meter-by-meter basis, whether a violation at a meter has occurred and, if so, to issue a citation. Of course, the individuals come at some expense to the city or town and for the large majority of the meters checked there is, in fact, no violation. Therefore, this process of monitoring adherence to the meter requirements is extremely inefficient and costly for cities and towns.

Private parking spaces are also available in such areas where parking spots are in short supply. These private spaces typically also come at some expense to the vehicle owner, but offer the convenience of not having to replenish the meter with coins throughout the day. For other reasons, private parking spaces may also be desirable, such as, for example, for greater security or convenience. That is, an office building, resort, or club may offer private parking spaces to its tenants, guests, or members. These private parking spaces often come in the form of a parking garage or lot that charges the vehicle owner based on time spent in the garage or lot. Many of these private garages or lots issue a fixed number of monthly parking passes for a monthly cost of $200 to $300, for example, per parking space or pass. In some cases, parking spaces are assigned to specific vehicles. With assigned spaces, improperly parked vehicles are frequently towed, but usually not until the proper occupant has determined that another vehicle is improperly occupying his space. In other arrangements, the public can use private parking garages and pay by the hour, for example. In such private parking arrangements, the owner of the private parking garage or lot often employs attendants to determine the time spent in the garage and to collect the corresponding payment from the vehicle owner.

SUMMARY OF THE INVENTION

The present invention is a parking status control system and method that automatically monitors one or more parking spaces for unauthorized occupancy. Such parking spaces may be publicly metered parking spaces or privately owned and controlled parking spaces. When a space is occupied, the owner or user of a vehicle may accomplish automated payment of parking fees, so as to avoid fines associated with citations due to an expired parking meter, for example. Preferably, whether paying for parking time in a garage or on a meter, standard methods of payment are accommodated. However, regardless of the methods of payment accommodated by various implementations, occupancy of the parking space and sufficiency of in payment are monitored to determine if a parking space is being illegally or improperly used.

Generally, a monitored space can be considered to have two states: 1) occupied, and 2) vacant. The presence or lack of a vehicle in a parking space is monitored by a vehicle presence detector. A vehicle presence detector may sense a vehicle in any of a variety of manners. For example, the vehicle presence detector may use magnetic, infrared, motion detection, pressure, temperature sensing, or acoustic sensing to determine whether a vehicle has parked in a monitored parking space. Once a vehicle is detected, the vehicle presence detector generates a space-state signal indicating that a vehicle is in the parking space. In other embodiments, a space-state signal could indicate that the parking space is vacant. In other embodiments, different space-state signals could be generated when the parking space is vacant and when it is occupied.

The space-state signal is communicated to a central computer system by wired or wireless means, or some combination thereof. For example, such means may include satellite links, global positioning system (GPS) links, cellular or traditional telephone links, copper wire lines or cables, fiber optic links, computer networks or any combination thereof. In some implementations, the vehicle presence detector communicates directly with the central computer system, by such communication means.

In other implementations, a local transponder proximate to the monitored space may be used to establish wired or wireless communication with the vehicle presence detector, wherein the local transponder may then receive and forward the space-state signal, or a signal indicative thereof, to the central computer system. The local transponder may communicate with the central computer system via any known communication means. Such means may include, for example, satellite links, cellular or traditional telephone links, copper wire lines or cables, fiber optic links, computer networks or any combination thereof.

When the space-state signal indicates to the central computer system that a monitored parking space is occupied by a vehicle, the central computer system then awaits, for a certain period of time, receipt of an authorization signal from a corresponding device associated with the monitored space and configured to accept or facilitate authorization to use the parking space. If the authorization signal is not received in due time, the central computer system declares a parking space violation, i.e., an illegally parked vehicle.

A space authorization device, such as a parking meter, may be provided that accepts an input to authorize use of the parking space, i.e., via generation of an authorization signal. In the case of a parking meter, the input may be the insertion of coins, credit or debit cards, or an account or status based user identification card to pay meter fees, or otherwise satisfy authorization requirements. In such a case, the parking meter is equipped with a meter transceiver that communicates an authorization signal to the central computer system in response to such inputs. The authorization signal may be provided directly to the central computer system or via the local transponder, using any of the previously discussed communication means. If the vehicle is in the parking space beyond the time paid for, the transceiver ceases to send the authorization signal and, if the vehicle is still in the parking space, the central computer system declares a violation.

In accordance with the present invention, a user or vehicle based portable transceiver may also be used to facilitate automated payment of meter fees, or the purchase of meter credits. In such case, the portable transceiver may be configured to provide an authorization signal to central computer system directly or via the local transponder, using any of the previously discussed communication mediums. This authorization signal is provided in lieu of an authorization signal being provided by the meter transceiver in response to the insertion of coins into the meter. The portable transceiver may be configured to accept debit card, credit card, or prepaid cards for parking as mechanisms for payment of meter fees or the purchase of meter credits used to pay the fees, or an ID card or means (e.g., a secure magnetic card or token). When credits are purchased, they may be "loaded on" the portable transceiver or stored in an account at, or accessed by, the central computer system. If a card is not used, user identification may be input at the portable transceiver to gain authorization to use the parking space.

Where portable transceivers are used, the meters having meter transceivers may be optional. In some implementations, the portable transceiver and meter transceiver may both be used. In such implementations, the portable transceiver and meter transceiver may communicate and one or both may be configured to provide the authorization signal, either in combination or independently. Also, the portable transceiver may be configured to communicate with central computer system via the meter transceiver, or vice versa.

The portable transceiver may be used to purchase time in a parking garage or authorize use of a private parking space. If the prepaid credits run out or the debit or credit card accounts cease to provide payment of meter fees, the authorization signal is terminated and, assuming the vehicle still occupies the parking space, a violation is declared by the central computer system. Additionally, the portable transceiver may be configured to provide an authorization signal that is not indicative of a monetary input, but is rather indicative of a status or designation where such monetary input is not required. For example, police, fire, medical, and government personnel or monthly garage pass holders may have such status or designation.

In some implementations, the portable transceiver may be integral with toll payment tokens, used for automatic payment of tolls on toll roads, as a single integrated solution. In such a case, a single user account may be used for payment of tolls and parking fees, or storage of credits useful to pay tolls and parking fees. In some implementations, the central computer system may access a credit or debit account for such payments. In various implementations, accounts used for payments of tolls and parking fees may be maintained separately. In other implementations, the portable transceiver may be integrated into typical handheld devices, e.g., cell phones, pagers, personal digital assistants, GPS receivers and so on.

Central computer system is aware of which parking spaces are vacant. The portable transceiver may also be configured to request, either automatically or upon user prompt, location of a vacant parking space. In one instance, if the user enters an address or landmark, the central computer system may provide the closest available parking space. The portable transceiver may also include, or be linked to, a GPS receiver. In such a case, given the user's (and portable transceiver's) location, the current computer system could provide the closest vacant parking space. Also using GPS, the portable transceiver could provide directions to such parking space.

When a violation is declared, the central computer system may generate a violation signal and, in response thereto, a meter monitor may be dispatched to the parking space to issue a parking ticket or take other appropriate action. The meter monitor may be equipped with a meter monitor device that allows each of the vehicle presence detector and transponder to be probed to ensure they are operating properly. Additionally, the meter monitor device may also be configured to receive the violation signal, and any relevant related information. The portable transceiver, meter transceiver, or both may also be configured to receive the violation signal and to actuate audio, visual, or both indicators of the violation condition. The meter monitor device may also include a GPS receiver and may output a route of spaces in violation status. The meter monitor device may also output route directions.

Central computer system may also be configured to send text messages, graphic messages, or some combination thereof to the portable transceiver, meter, meter monitor device, or some combination thereof. Such messages could relate to warnings, parking space use limitations or restrictions, e-commerce, or user account status, as examples. Such messages could also be forwarded to user electronic devices, such PDAs, cell phones, e-mail accounts, via any of a variety of known networks, such as the Internet, Web, and cellular telephone networks.

BRIEF DESCRIPTION OF THE DRAWINGS

The foregoing and other objects of this invention, the various features thereof, as well as the invention itself, may be more fully understood from the following description, when read together with the accompanying drawings, described.

For the most part, and as will be apparent when referring to the figures, when an item is used unchanged in more than one figure, it is identified by the same alphanumeric reference indicator in all figures.

DETAILED DESCRIPTION OF THE PREFERRED EMBODIMENT

The present invention is a parking status control system and method, which allows a parking space, or plurality of parking spaces, to be automatically monitored for unauthorized occupancy. The system and method may be applied to metered parking spaces or to other situations where controlled access to a parking space or area is desired. The presence or lack of a vehicle in a monitored parking space is determined using a vehicle presence detector, which communicates a signal indicative of such lack of vehicle presence to a central system. A user or vehicle based authorization module is configured to transmit an authorization signal to facilitate automated satisfaction of fees for a parking space, e.g., payment of a parking meter. If there is occupancy in a parking space, but no proper authorization signal, the central system declares a violation and communicates the violation to another system or individual charged with taking corrective action.

Figure 1A:
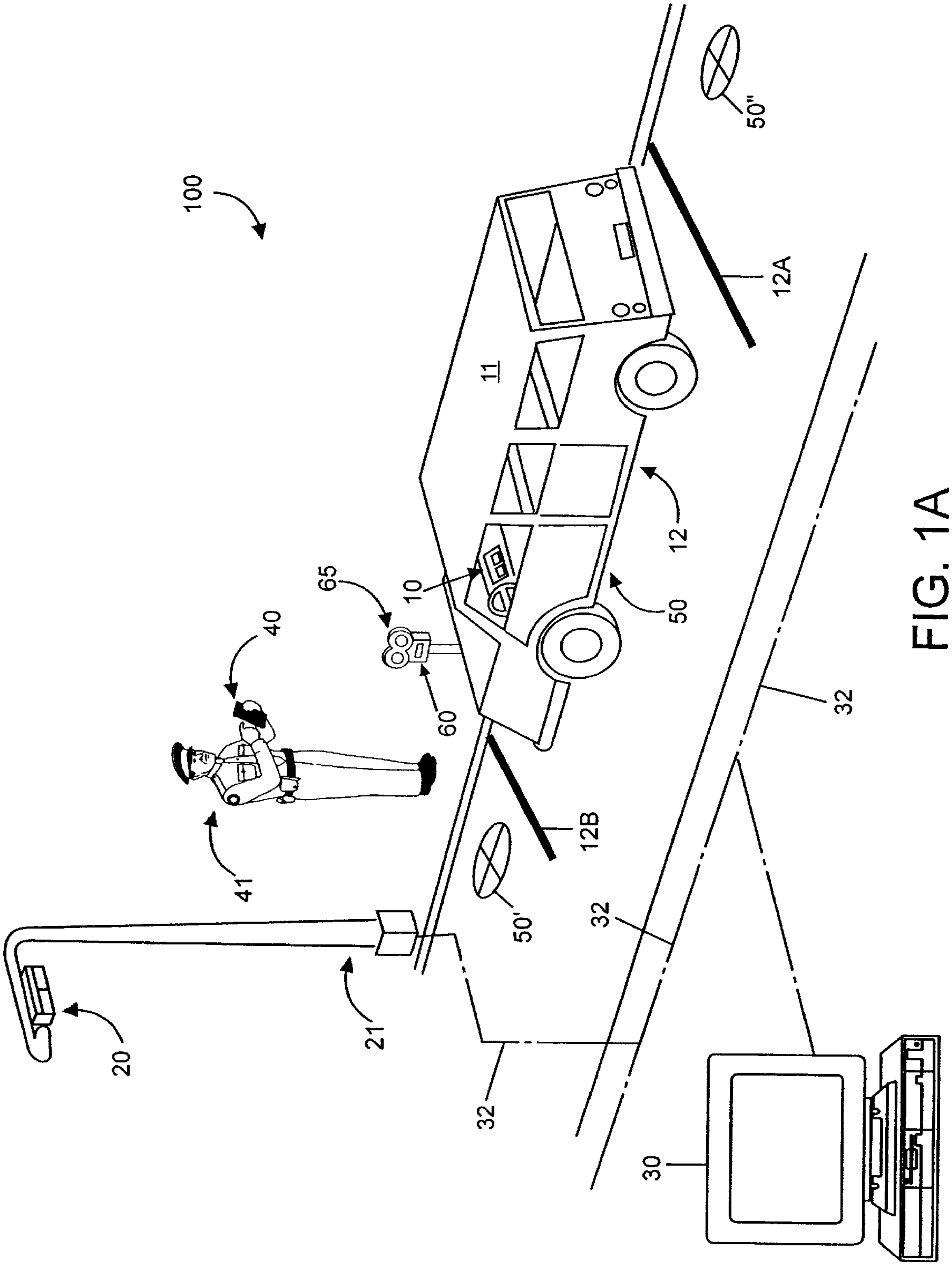
FIGS. 1A through 1C are system level diagrams of parking status control systems in accordance with the present invention.
Figure 1B:
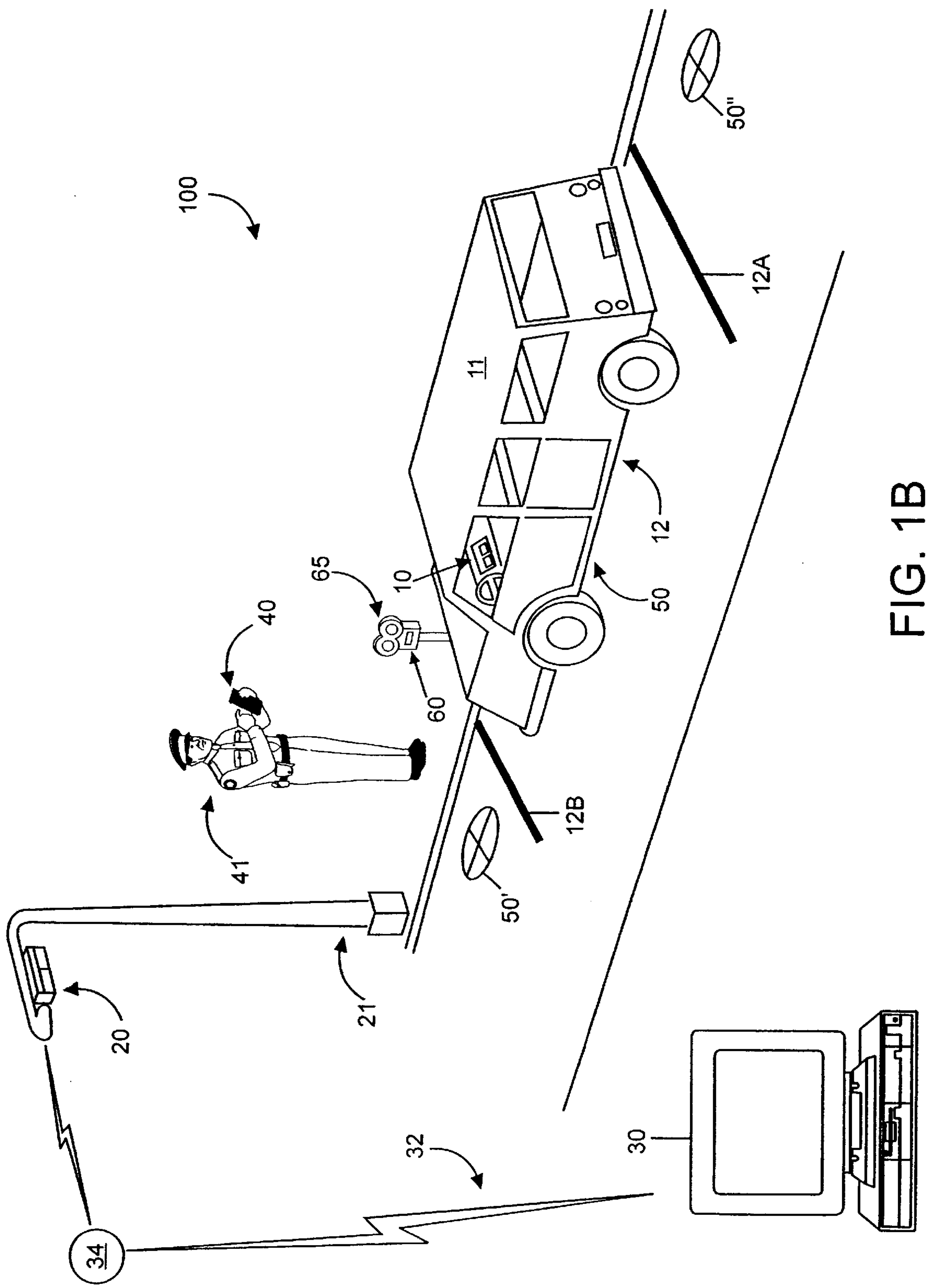
Figure 1C:
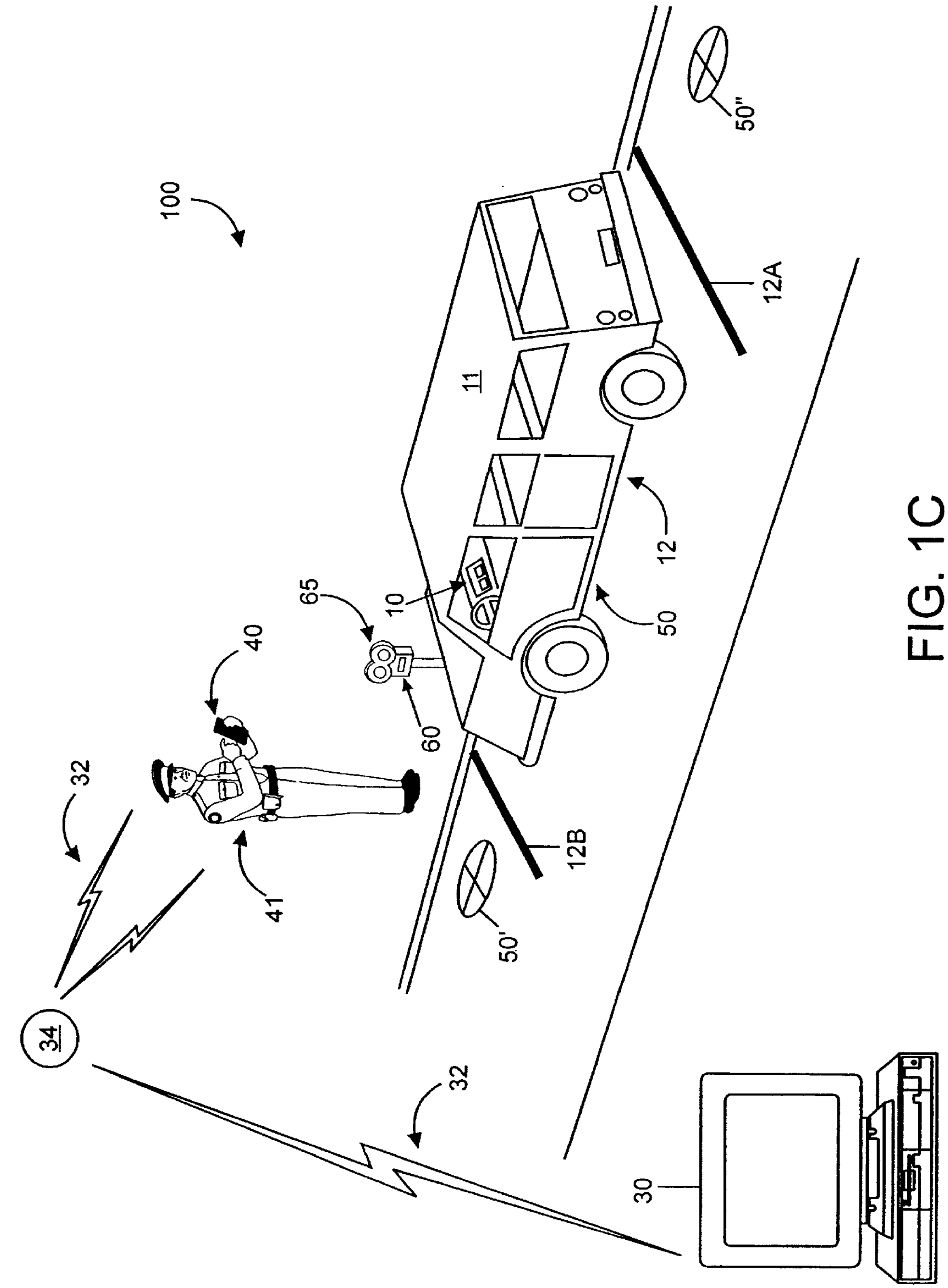

FIG. 1A through FIG. 1C show embodiments of parking status control system 100 in accordance with the present invention. As is typical, a parking space 12 is defined by parking iris space lines 12A and 12B, between which a vehicle 11 is parked. Parking space 12 has two possible states, i.e., vacant or occupied, and may be metered by a parking meter 65, as a space authorization device. In these embodiments, each parking space includes an in-ground detector, as a vehicle presence detector unit. Depending on the embodiment, the vehicle presence detector may be configured to respond to the presence or lack of a vehicle occupying the corresponding monitored parking space. Though not visible in FIG. 1A through FIG. 1C, an in-ground detector 50 is positioned in parking space 12, and oriented similarly to detectors 50' and 50" in the adjacent parking spaces. There are a variety of manners in which in-ground detector 50 may sense the presence of vehicle 11 occupying parking space 12, but in the embodiments of FIG. 1A through FIG. 1C, in-ground detector 50 establishes a magnetic field within which vehicle 11 can be detected.

A central computer system 30 serves as a central monitor and processor of various system resources. Those skilled in the art will appreciate that central computer system 30 is shown as having a single computer for illustrative purposes, but that central computer system 30 may be comprised of several computers, processors, and/or servers and that there may be several of such devices collocated, remote to each other, or some combination thereof. Each parking space, and/or each meter (if used), is uniquely identified, so that the central computer system 30 can make specific determinations of which parking spaces are being used without authorization.

As long as central computer system 30 is in receipt of the authorization signal for a given space from a meter or portable transceiver, central computer system 30 will consider the use by a vehicle in that parking space to be valid. Such authorization signals may be provided by either of a meter transceiver 60 or a portable transceiver 10, which may each be configured to continually or periodically send the authorization signal. In other embodiments, the meter transceiver 60 and portable transceiver 10 can be configured to transmit an authorization signal at the start of a parking session (i.e., upon receipt of a valid input) and then transmit a termination signal when the parking session is over (i.e., when the car is vacating the parking space).

Central computer system 30 may be operated on behalf of a local police department or municipality, or linked to a local police department system for automatically issuing parking citations and/or deploying tow trucks in response to a determination by central computer system 30 of a parking meter violation. Such a violation occurs when a vehicle is detected in a given parking space, but an authorization signal is not provided within some predefined period of time. In such a case, the identity of the vehicle must be known to central computer system 30, either by a data base or system configured for access by central computer system or through communication with or by a meter monitor 41.

Figure 8:
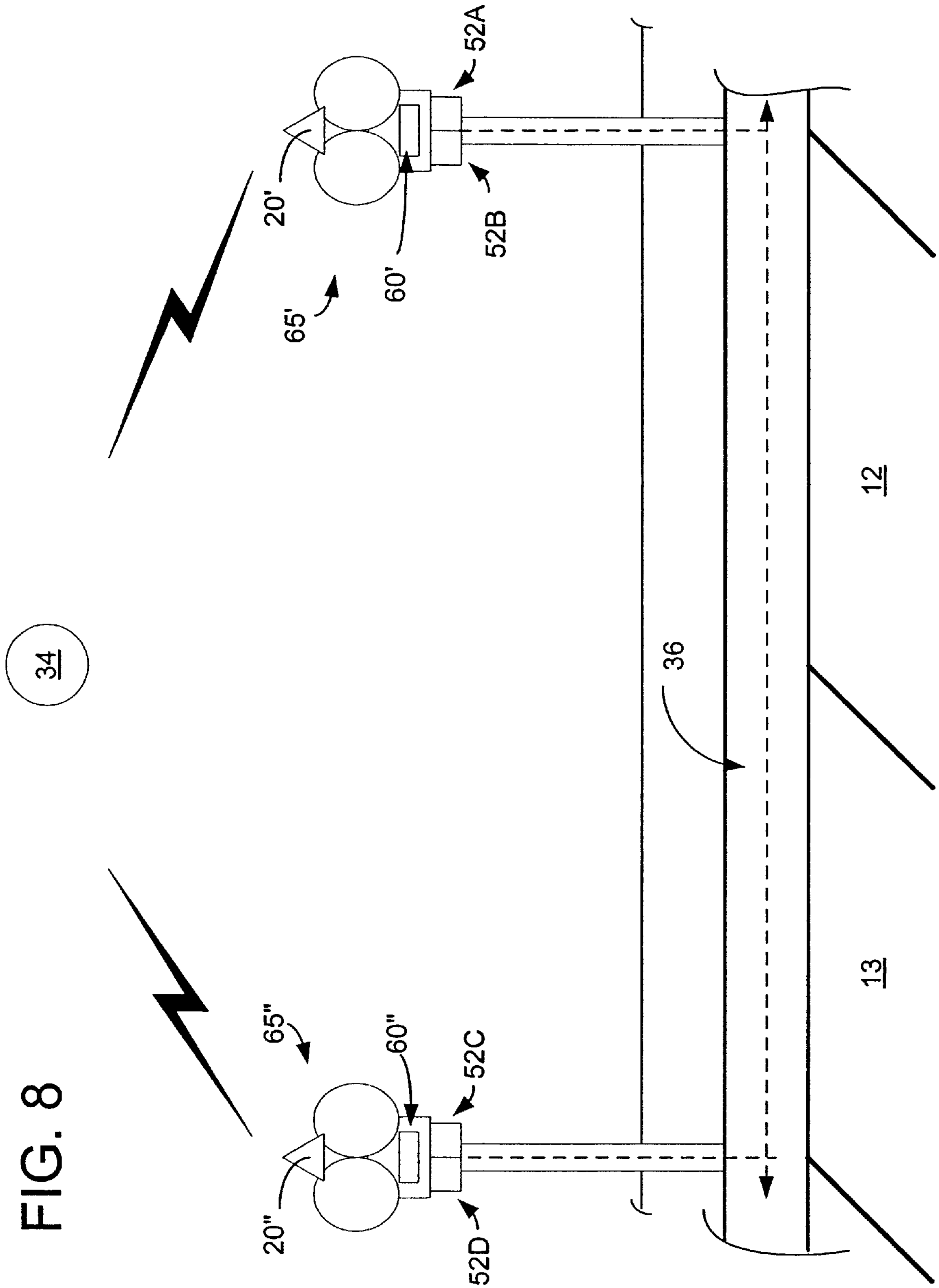
FIG. 8 is system level diagram of an alternative parking status control system in accordance with the present invention.
Figure 9:
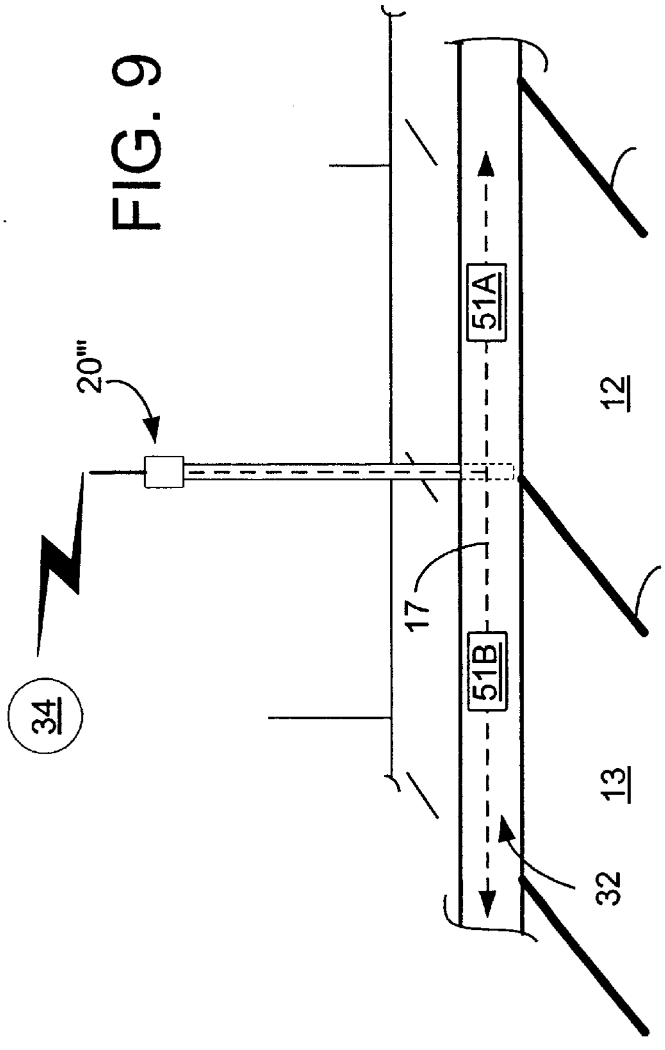
FIG. 9 is system level diagram of a different alternative parking status control system in accordance with the present invention.

Communication with central computer system 30 may be accomplished through a local transponder 20, as is shown in each of FIG. 1A through FIG. 1C (as well as in FIG. 8 and FIG. 9). The communication path between transponder 20 and central computer system 30 is shown as path (or link) 32 in FIG. 1A through FIG. 1C. Path 32 may be any known wired or wireless communication path or means. Such means may include, for example, satellite links, cellular or traditional telephone links, copper wire lines or cables, fiber optic links, computer networks or any combination thereof. For example, in FIG. 1A transponder 20 and central computer 30 communicate, at least in part, via a land line. In FIG. 1B, transponder 20 and central computer system 30 communicate, at least in part, via a satellite link 32 that includes a satellite 34. In the embodiment of FIG. 1C, in-ground detector 50 communicates directly with central computer system 30 via, at least in part, a wireless path 32 that includes a satellite 34.

In some embodiments, diagnostics may be included with the parking status control system. In such a case, some or all of the diagnostics may be managed by central computer system 30, through interaction with transponder 20 (if provided), transceiver 60 (if provided), in-ground detector 50, portable transceiver 10, or some combination thereof. Such diagnostic interaction with these various system components may be direct or via transponder 20, depending on the implementation.

In various embodiments, the communication path between in-ground detector 50 and transponder 20 may be wired, wireless, or some combination thereof. For example, the communication path between in-ground detector 50 and transponder 20 is a wireless path in FIG. 1A and FIG. 1B. However, in other embodiments, the communication path between in-ground detector 50 and transponder 20 may be a wired network or direct line (e.g., copper, fiber optic, or cable), such as is FIG. 8 and FIG. 9. In FIG. 1C, a local transponder is not included.

Depending on the embodiment, transponder 20 may be configured to selectively communicate with one or more in-ground detectors 50. For example, to service a plurality of in-ground detectors, transponder 20 can be configured to implement a time division multiplexing scheme for servicing each of the several in-ground detectors in-turn or transponder 20 can be configured to passively "listen" to several in-ground detectors. Furthermore, in FIG. 1A and FIG. 1B transponder 20 is mounted on a pole 21, but transponder 20 may alternatively be mounted on other surfaces or items, such as a wall, a sign, or a cable, as examples.

In FIG. 1A through FIG. 1C portable transponder 10 is located within vehicle 11. In such cases, portable transceiver 10 may be integrated into the vehicle, as is a radio, for example, and powered by a vehicle power source (e.g., car battery). When integral with the vehicle, portable transceiver 10 may be configured to allow use by a plurality of individuals (depending on the individual operating the vehicle, for example), requiring a user specific input at portable transceiver 10 to ensure a proper user account is accessed for authorization to park in a given space. In other embodiments, a portable transceiver may be carried by a user (e.g., the driver of a vehicle). In such cases, the portable transceiver may be user-based and battery powered, such that the user can use the portable transceiver, regardless of the vehicle the user is operating.

Figure 2A:
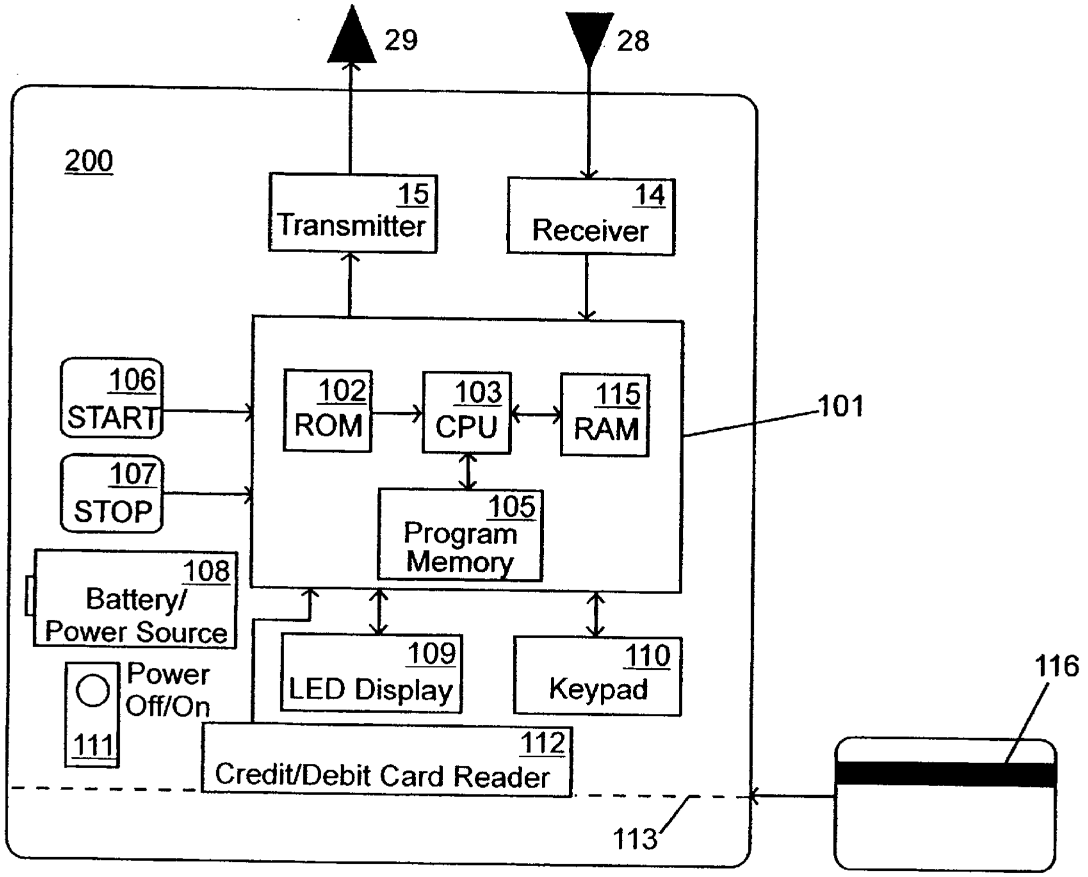
FIG. 2A is a circuit diagram and FIG. 2B is a perspective view of the portable transceiver of FIG. 1.
Figure 2B:
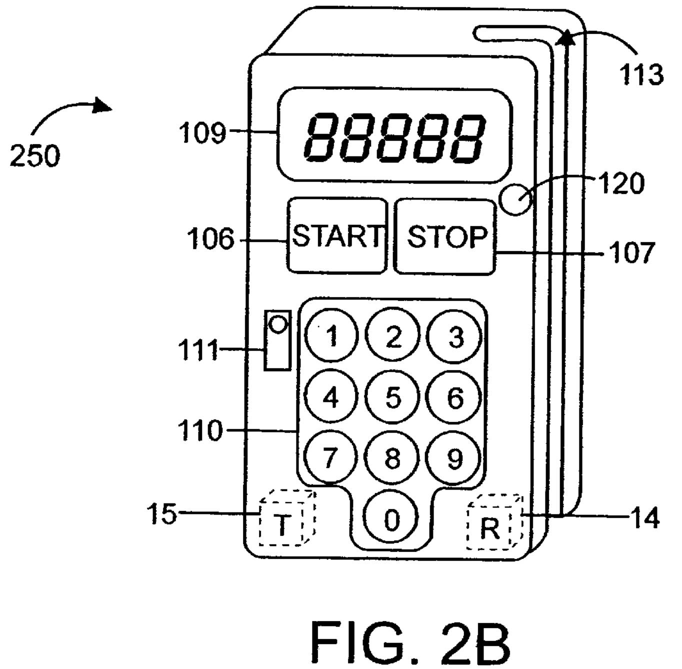

Portable transceiver 10 may be more fully appreciated with respect to FIG. 2A and FIG. 2B. FIG. 2A shows a block diagram 200 and FIG. 2B shows a perspective exterior view 250 of one embodiment of a portable transceiver in accordance with the present invention. According to block diagram 200, an embodiment of a portable transceiver includes a processor 101, having a central processing unit (CPU) 103 and various types of memory. The memory includes program memory 105, which provides long term storage of functional code, read only memory (ROM) 102, and random access memory (RAM) 115. The portable transceiver is powered by a battery source 108, which may be any of a number of commonly available power sources. To facilitate user interaction with the portable transceiver, a start button 106, stop button 107, display 109 (e.g., light emitting diode (LED) display), keypad 110, and on/off power switch 111 are provided. In other embodiments, keypad 110, could be an alphanumeric keypad, allowing input of text messages. Additionally, display 109 could be configured to display text and graphic messages.

The portable transceiver of FIG. 2A and FIG. 2B also include a card slot 113 and reader 112 that enables use of a card 116 for the payment of parking fees or purchasing of parking credits using, for example, a typical credit or debit card. Additionally, card slot 113 and reader 112 may be used to read a prepaid card of parking credits or to read a user or vehicle identification card. When a user or vehicle identification card is used, the identification of the user or vehicle may be linked to an account from which parking fees are paid or to a designation of the user or vehicle for which payment of parking fees is not required for authorization. Such accounts may be under management of, or accessed by, central computer system 30. In some embodiments, portable transceiver 10 may include a magnetic card reader having encrypted information necessary to generate an authorization signal stored thereon.

Certain groups or individuals may not be required to pay parking fees, such as police department personnel, fire department personnel, ambulance operators, government officials, pass holders in a parking garage, or members of a club, as examples. A database of such groups, individuals or vehicles may be maintained by or linked to central computer system 30. Therefore, a portable transceiver for such groups, individuals, or vehicles can be configured to generate and transmit an authorization signal that is not indicative of a monetary input, but that does satisfy central computer system 30 to gain authorization to use a parking space. Depending on the embodiment, an identification card may be used by such individuals with ant portable transceiver 10 or meter 65 to cause generation of the authorization signal.

In other embodiments, portable transceiver 10 may include pager, cellular telephone, e-mail, GPS, or personal digital assistant (PDA) functionality, or some combination thereof. In various embodiments, portable transceiver functionality may be integrated into such devices. Portable transceiver 10 is configured to communicate with central computer system 30, and may also be configured to communicate with other systems via the Internet and Web systems, telephone networks, cellular telephone networks, and so on. Portable transceiver 10 may be linked to such system through central computer system 30, or via other means. Such systems may serve as information providers, receivers, or both to portable transceiver 10, and/or meter transceiver 60 (which could also be configured with a display capable of displaying text and graphics messages). In such cases, display 109 of portable transceiver 10 may also be configured to display e-mail messages, e-commerce information (e.g., ads), pager messages, news and other informational messages, updates and bulletins.

Display 109 could also be configured to display alerts, such as to inform the user that parking space 12 will be not available for use (e.g., reserved or off limits) during certain periods of time or beginning at a certain time. For example, the parking space may be off-limits for snow removal, street cleaning, road work, or truck deliveries. In such a case, once start button 106 of portable transceiver 10 is pushed, or authorization of parking space 12 has been given, central computer system 30 could send a message (e.g., scrolling LED message) to display 109 of portable transceiver 10 stating "PARKING IN THIS PARKING SPACE IS PROHIBITED FROM 2:00 AM THROUGH 5:00 AM MONDAY-FRIDAY FOR STREET CLEANING." Central computer system 30 may also be configured to forward such messages to the user's e-mail account, cell phone, pager, PDA, or other such devices. Display 109 may also inform the user that credits associated with the user's account need to be replenished.

In other embodiments, a portable transceiver in accordance with the present invention may be integral with toll payment tokens, used for automatic payment of tolls on toll roads, as a single integrated solution. In such a case, a single user account may be used for payment of tolls and parking fees, or storage of credits useful to pay tolls and parking fees. In some embodiments, the central computer system may access a credit or debit account for such payments. In various embodiments, accounts used for payments of tolls and parking fees may be maintained separately.

Figure 3:
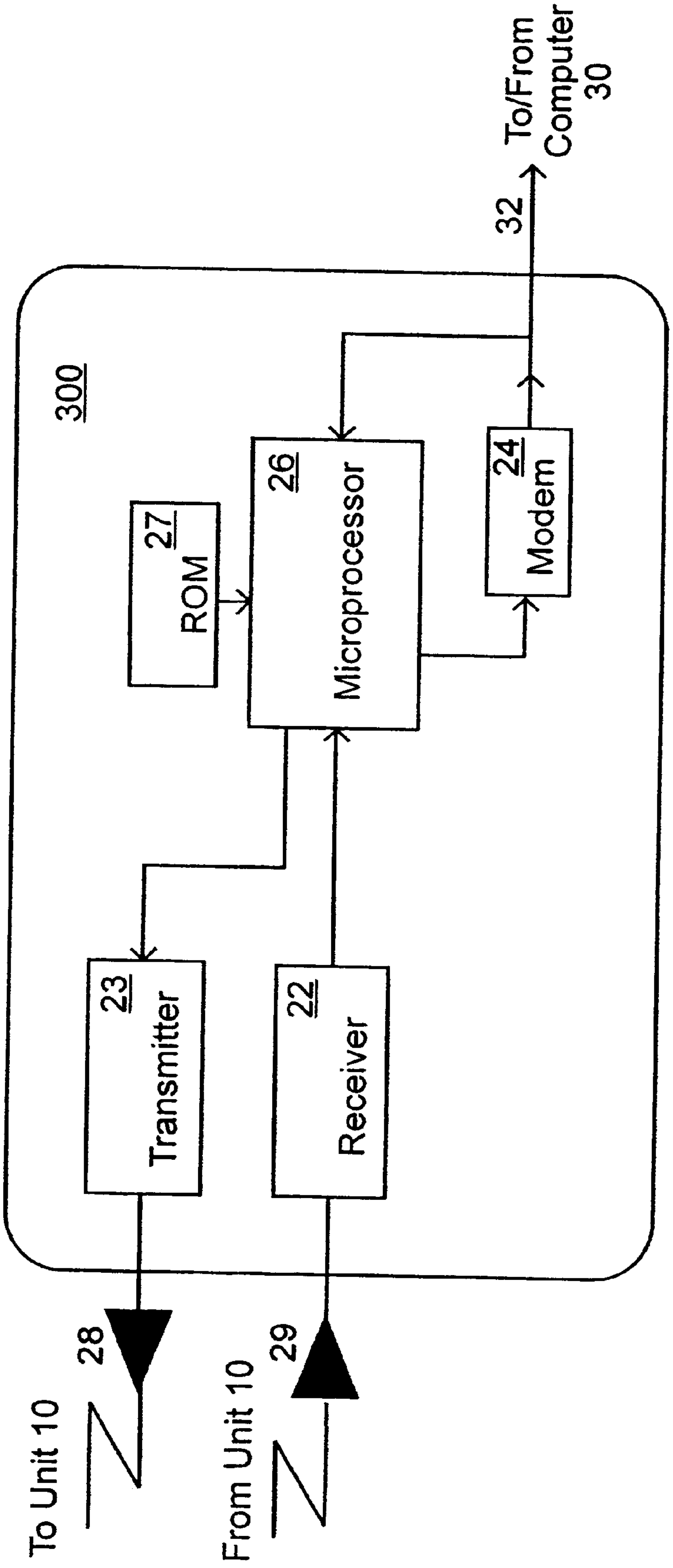
FIG. 3 is a circuit diagram of the transponder of FIGS. 1A–1C.

FIG. 3 shows a circuit diagram 300 for pole mounted transponder 20. When included, transponder 20 communicates with each of in-ground detector 50, meter transceiver 60, and portable transceiver 10 and provides a means for communication with central computer system 30 via a wired or wireless link 32, as is shown variously in FIG. 1A through FIG. 1C. For example, transponder 20 may communicate with central computer system 30 via a communication means that includes a satellite link. Transponder 20 may also communicate with a meter monitor device 40 by any of a variety of communication means discussed herein, such as a satellite link (e.g., a global positioning system (GPS)). Transponder 20 includes standard components, such as receiver 22, transmitter 23, microprocessor 26, ROM 27, and modem 24. In the preferred form, transmitter 23 and receiver 22 provide an interface to portable transceiver 10, in-ground detector 50 and meter transceiver 60, and possibly GPS. Modem 24 provides an interface to central computer system 30. The various communications between these devices may vary, depending on the configuration and functionality of devices included.

Figure 4:
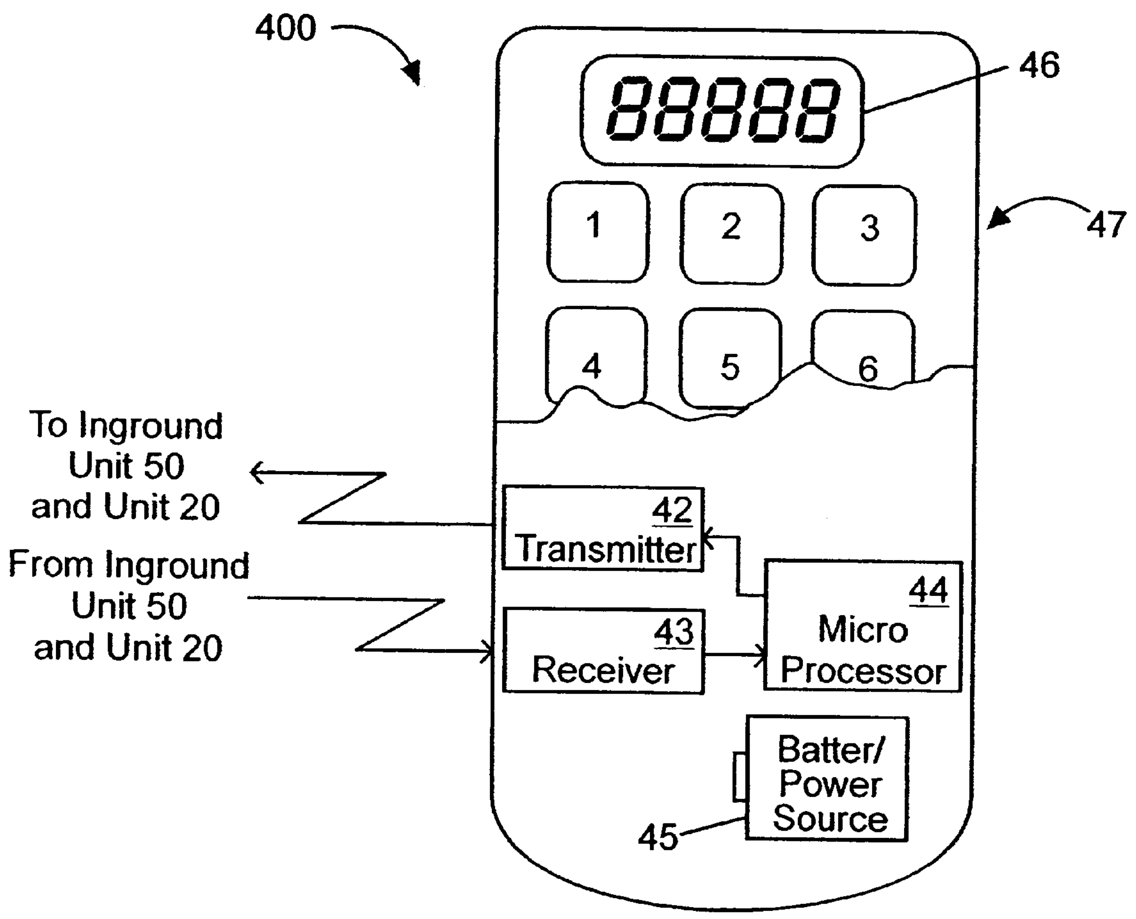
FIG. 4 is a partial cutaway view of the meter monitor device of FIGS. 1–1C.

FIG. 4 is a partial cutaway view 400 of the meter monitor device 40, wherein the cutaway shows a simplified circuit diagram. Meter monitor device 40 includes a transmitter 42, receiver 43 and microprocessor 44, and is powered by battery 45. In the preferred embodiment, transmitter 42 and receiver 43 facilitate two-way communications with central computer system 30 via wireless means previously discussed, or with transponder 20 (if provided) and in-ground detector 50 to perform the probing operations previously discussed. For example, meter monitor device 40 may communicate with central computer 30 via a satellite or GPS link. To perform probing operations, meter monitor device 40 includes a set of diagnostic signal generation logic, used to provide test signals or information request signals to a device being probed (e.g., transponder 20, vehicle presence detector 50, or meter 65).

Meter monitor device 40 may also be configured to communicate with portable transceiver 10 or central control system 30 to obtain user identification information, issue parking citations or warnings, and/or send text messages to the user/owner of portable transceiver 10 or central computer system 30. Such information and messages may be stored at portable transceiver 10 or at central computer system 30, or at some other system linked thereto, or forwarded via the Internet and Web. Central computer system 30, for example, may be configured to receive messages from central computer system 30 and to forward such messages and information to a cell phone, pager, personal digital assistant or e-mail device or account associated with the user. Interfaces may also be provided to transponder 20 to facilitate communication with central computer system 30, for the various embodiments discussed herein. While meter monitor device 40 is depicted as being a handheld device, in other embodiments meter monitor device 41 may be integral with a vehicle (e.g., a patrol car of an enforcement organization).

In other embodiments, the meter monitor device 40 may include a greater compliment of functionality. For example, the violation signal, or a corresponding signal, could be forwarded from the central computer system 30 to meter monitor device 40 to automatically inform the meter monitor 41 of the illegally parked vehicle. Such communication could be via any manner of wireless means, such as via satellite links, GPS links, cell phone links, or via the system's transponders (e.g., transponder 20). If meter monitor device 40 is configured to receive the violation signal, the meter violation signal could identify the meter and/or its location on a display of the meter monitor device 40, e.g., meter ABC, 12 Main Street, Town/City. It could also cause an alert (e.g., a tone or flashing red light) to be actuated at meter monitor device 40. If the identity of the user or vehicle were known to the central computer system 30, the meter monitor device 40 may also be configured to provide that or similar information to meter monitor 41.

If there were several violations occurring simultaneously, central computer system 30 may be configured to prioritize the violations based on any number of criteria, such as geographic proximity or time in unauthorized use state. If a meter monitor 41 has a dedicated geographic region of responsibility, central computer system 30 may provide the prioritized list and an accompanying route to meter monitor device 40. Preferably, such route is an optimized path to the various violations. A GPS link may be provided to facilitate generation of such routes.

Figure 5:
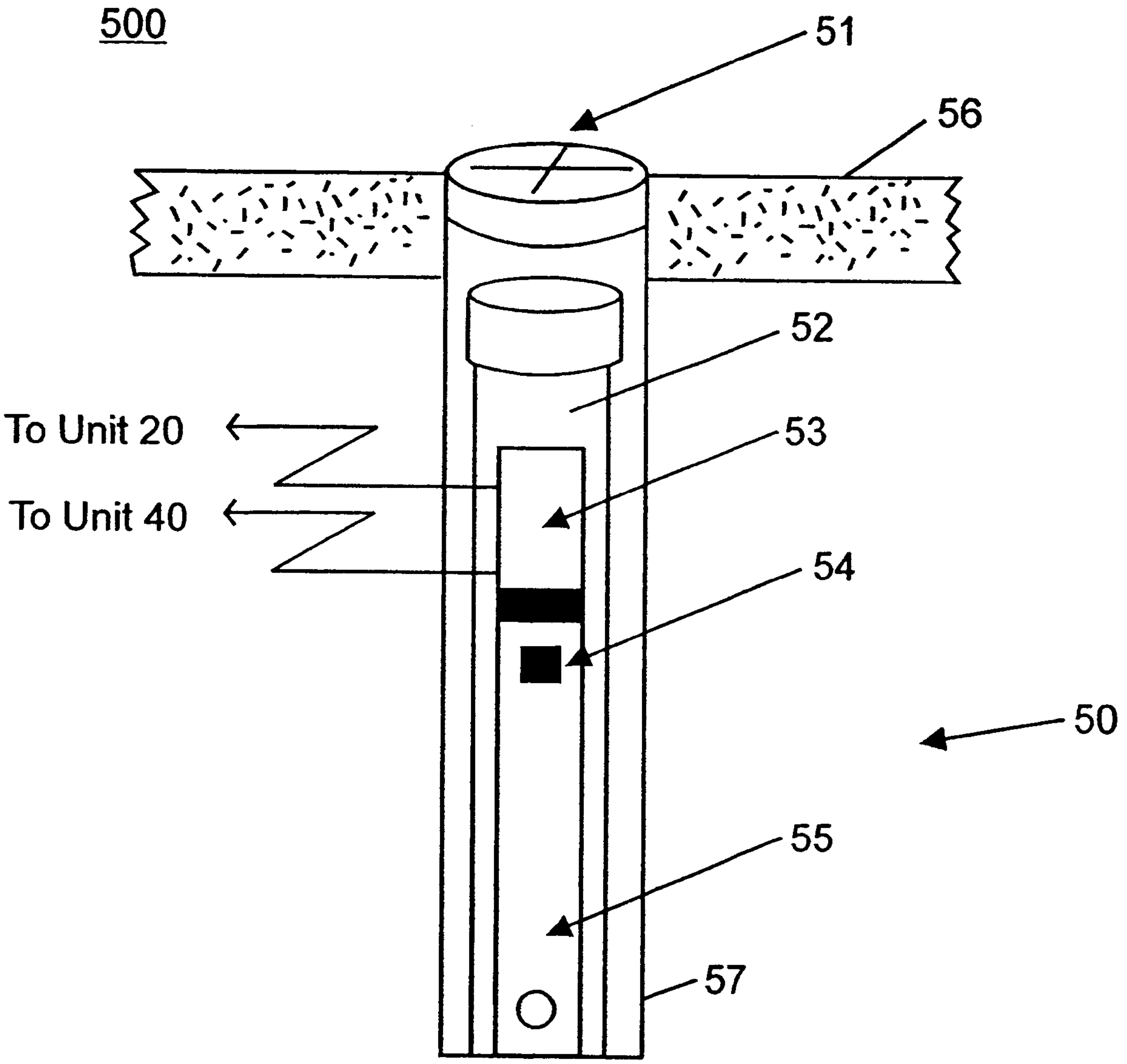
FIG. 5 is a cross sectional view of the in-ground detector of FIGS. 1A–1C.

FIG. 5 shows a cross section diagram 500 of in-ground detector 50 (i.e., a vehicle presence detector) of the embodiments of FIG, 1A through FIG. 1C. In one embodiment, once a vehicle is detected in parking space 12, a space-state signal produced by the vehicle presence detector indicating that space 12 is vacant is no longer received by central computer system 30. In such an embodiment, in-ground detector 50 may cease transmission upon detection of vehicle 11. In yet another embodiment, in-ground detector 50 may be configured to continuously transmit a space-state signal, such as a simple pulse of energy, which is not received by central computer system 30 when vehicle 11 occupies parking space 12, due to the fact that a vehicle in parking space 12 physically blocks the wireless communication path between in-ground detector 50 and transponder 20 or satellite 34, depending on the embodiment. In yet another embodiment, in-ground detector 50 may be configured to transmit a signal at each change of state, i.e., from vacant to occupied and from occupied to vacant. In other embodiments, in-ground detector 50 may be configured to transmit a space-occupancy signal when parking space 12 is occupied and cease to transmit the space-state signal when parking space 12 is vacant. In yet other embodiments, in-ground detector 50 may transmit a space-unoccupied signal when parking space 12 is vacant and transmit a space-occupied signal when a vehicle is parked in space 12.

In the embodiments of FIG. 1A through 1C, in-ground detector 50 is located in a cavity in the pavement of its corresponding parking space 12. Preferably, the cavity is defined by a canister 57 having a removable cap 51 that is substantially flush with the surface of pavement 56. The in-ground detector 50 may also be located within a container 52. Such a configuration allows greater protection of in-ground unit 50 during storage, transport, and location within canister 57, and facilitates removal of in-ground unit 50 (while remaining within container 52) for maintenance and replacement.

In-ground detector 50 includes an antenna 53 that facilitates communication with transponder 20 (if provided) and meter monitor device 40, as previously described. In this embodiment, the vehicle sensing mechanism is a magnetic sensing unit 54 that, through its magnetic field, detects the presence of a vehicle above. With such a magnetic sensing unit 54, it is important that container 52, canister 57 and cap 51 do not perturb or interfere with (e.g., shield) the magnetic field interaction between a vehicle above and magnetic sensing unit 54. A group of electronics 55, including a microprocessor and associated memory, carry out the aforementioned functionality of in-ground detector 50, such as the generation, transmission, reception and processing of messages exchanged with transponder 20 (if provided) and meter monitor device 40. In-ground unit 50 of FIG. 1A through 1C is a relatively low power device that may be powered by any of a number of known battery types. Alternatively, power could be provided to container 57, canister 52, or electronics 55 via an in-ground AC or other DC source.

In other various embodiments, a vehicle presence detector may be mounted on, coupled to, or integral with a wall (see FIG. 10), a curb (see FIG. 9), pole, a cable, or meter adjacent to a parking space (see FIG. 8). Depending on the messaging and communication scheme between the vehicle presence detector and transponder 20 (when provided), a line of sight path between the two may or may not need to be maintained.

Figure 10:
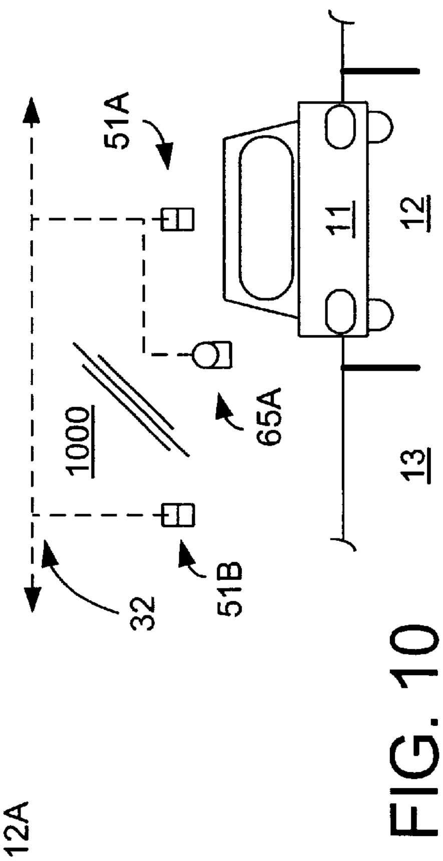
FIG. 10 is a system level diagram of a parking status control system having a wall mounted vehicle presence detector.

In other embodiments, the vehicle presence detector and transponder may be collocated with or integrated into a single module, and that module may be located in-ground or mounted on, coupled to, or integral with a pole, wall, meter, curb, cable, or the like. For example, in FIG. 8 transponder 20' and vehicle presence detectors 52A and 52B (monitoring space 12) are integral with meter 65' and transponder 20" and vehicle presence detectors 52C (monitoring space 13) and 52D are integral with meter 65". In FIG. 10, vehicle presence detectors 51A and 51B are mounted to wall 1000.

In yet other embodiments, the vehicle presence detector (e.g., in-ground detector 50) may communicate directly with central computer system 30 and transponder 20 may be omitted. This communication may be by wired or wireless means (shown in FIG. 1C), or some combination thereof. Such means may include, for example, satellite links, cellular or traditional telephone links, copper wire lines or cables, fiber optic links, computer networks or any combination thereof. For example, in FIG. 1C, in-ground detector 50 and central computer system 30 communicate via a satellite link 32 that includes satellite 34. In yet other embodiments, in-ground detector 50 may be configured to communicate with central computer system 30 via meter transceiver 60, if provided.

Figure 6:
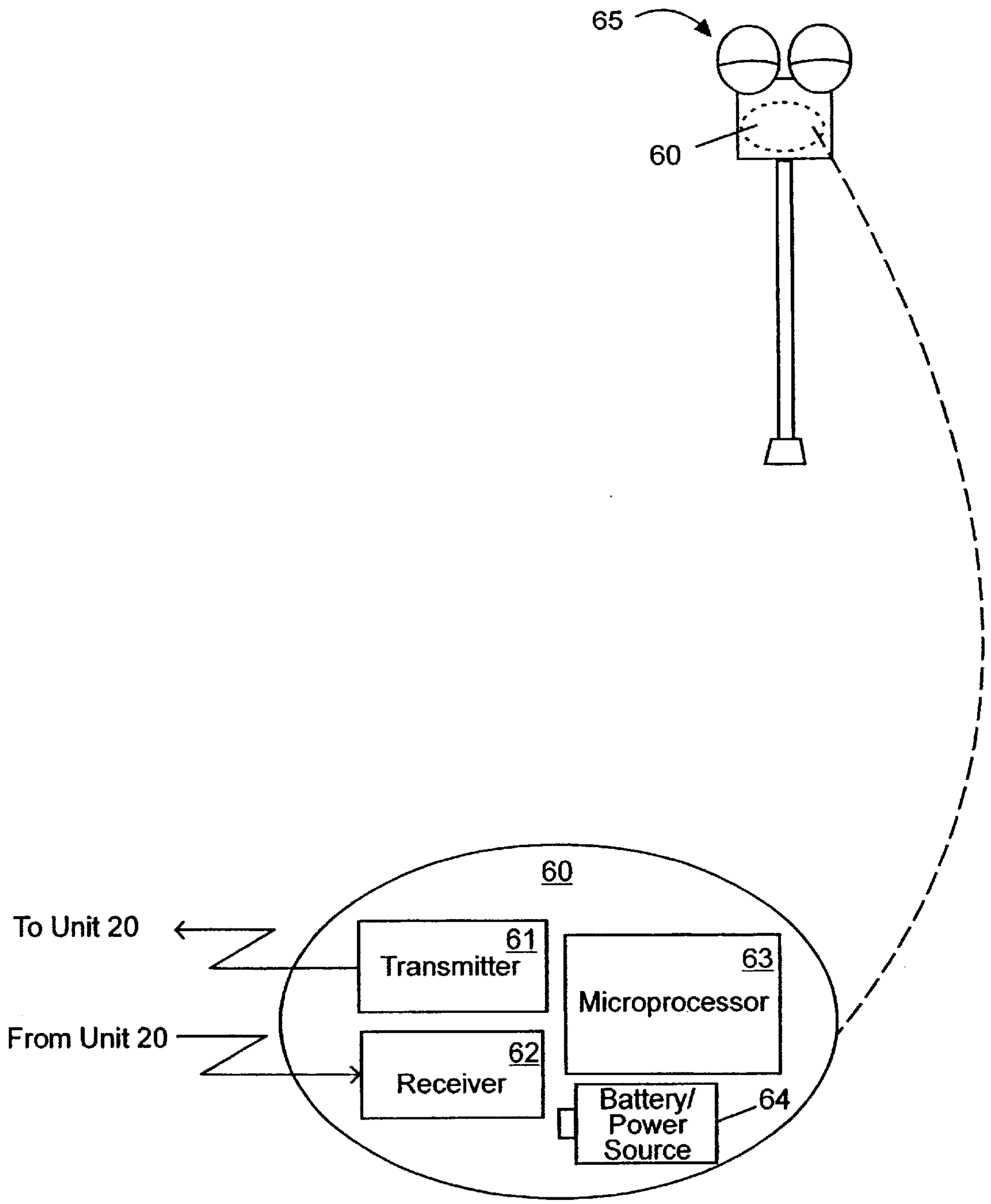
FIG. 6 is view of the meter transceiver of FIGS. 1A–1C.

FIG. 6 shows a parking meter 65 configured with meter transceiver 60, in accordance with the present invention. Preferably, meter transceiver 60 is configured to fit within a standard meter housing or to couple thereto. Meter transceiver 60 includes a transmitter 61, receiver 62, and microprocessor 63 that are driven, preferably, by a battery power source 64. Transmitter 61 and receiver 62 provide a communications interface with transponder 20 (if provided), as previously discussed. For example, meter transceiver 60 communicates an authorization signal to central computer system 30 via transponder 20 (if provided) in response to coin inputs at the meter. Otherwise, meter transceiver 60 communicates directly with central computer system 30 via, for example, a satellite link. In various embodiments, transmitter 61 and receiver 62 may also, or alternatively, be configured to communicate with in-ground unit 50, meter monitor device 40, and/or portable transceiver 10. As previously noted, meter 65 and meter transceiver 60 may not be required in the present invention, but may be included to provide an alternate means to that of portable transceiver 10 for providing an authorization signal to central computer system 30. In other embodiments, portable transceiver 10 may be omitted, in reliance on meter 65 and meter transceiver 60.

Meter transceiver 60 is preferably configured to communicate with central computer system 30 in response to receipt of a valid input to authorize use of parking space 12. The valid input to meter 65 causes the generation and transmission of an authorization signal provided by meter transceiver 60, as an alternative to generation and transmission of an authorization signal by portable transceiver 10. As an example, an authorization signal transmitted by meter transceiver 60 provides an indication to central computer 30 that meter 65 has received coin, credit card or debit card payment of meter parking fees.

Other types of valid inputs may also be accommodated, such as a signal from portable transceiver 10 to meter transceiver 60, a prepaid parking card input, and user and/or vehicle identification input, wherein said identification is correlated to an account for payment or a designation that such user or vehicle is not to be charged for parking. That is, in various embodiments of the present invention, in addition to, or instead of, typical coin inputs, meter transceiver 60 can generate, and central computer system 30 can process, an authorization signal based on inputs indicative of monetary credits, financial account information, or a user or vehicle based authorization not to charge for parking.

In some embodiments, when meter 65 or a like device is included, central computer system 30 may be configured to communicate messages to meter transceiver 60. For example, if central computer system 30 is aware that there is a vehicle occupying space 12, but an authorization signal has not been received in due time, a violation is declared. Central computer system 30 may send a violation signal to meter transceiver 60, causing meter 65 to take any of a variety of actions, e.g., light a flashing red light at meter 65, sound a tone at meter 65, or both. Additionally, a camera (or other imaging device) may be coupled or linked to a meter, transponder, or vehicle presence detector and upon receipt of a violation signal, the camera could be configured to take moving or still images of the vehicle illegally occupying the parking space.

FIG. 7A through FIG. 7D show one embodiment of a method that may be implemented with the system of FIG. 1A. In such an embodiment, central computer system 30 has information indicating that parking space 12 is vacant (i.e., a vacant state), shown as step 702 in flowchart 700 of FIG. 7A. This determination is made by central computer system 30 based on the receipt or absence of a signal from in-ground detector 50 indicating whether or not space 12 is occupied, in step 704. In-ground detector 50 periodically sends the space-state signal to central computer 30 via transponder 20, in step 706, while parking space 12 is vacant. Local transponder 20 may also, optionally, monitor the technical integrity of in-ground detector 50, in step 708. Returning to step 704, once in-ground detector 50 senses the presence of a vehicle in parking space 12, in this case vehicle 11, central computer system 30 no longer receives the space-state signal from in-ground detector 50, in steps 710 and 712, via local transponder 20.

Once central computer system 30 is alerted to the presence of a vehicle in parking space 12, in step 714, central computer system 30 may be configured to await (or "listen" for) a signal from a corresponding portable transceiver 10, in step 716. If such a signal is not received within, for example a grace period, central computer 30 alternatively awaits, in step 766, an authorization signal from meter 65 in response to a valid meter input. When a user inserts coins into meter 65 (as an example of one type of valid meter input), the meter transceiver 60 generates and transmits an authorization (or "in use") signal to central computer 30 via transponder 20 (if provided), in step 768. If configured with a card reader, other types of valid meter inputs may include credit, debit, prepaid, or user identification card inputs or communications from portable transceiver 10. In such a case, steps 718 through 764 may also be accommodated for meter 65. Entry of a PIN would require meter 65 to also include a keypad, as discussed below.

In step 716, the awaited signal may be a transmitted by portable transceiver 10 as an indication that portable transceiver 10 is powered on. The user may be given a grace period (e.g., 5 minutes) to power on his portable transceiver and produce the signal. In lieu of meter 65 inputs, to commence authorization, user identification, and/or electronic payment of parking fees using portable transceiver 10, the user of vehicle 11 presses start button 106, in step 718, and an identification of portable transceiver 10 (or a transceiver ID) is transmitted to central computer system 30 via transponder 20 (if provided), in step 720. Central computer system 30 transmits an acknowledgement message back to portable transceiver 10, in step 724, which includes a request for debit card, credit card, and/or other user identification information, and may provide parking rate information for space 12. The parking rate, which may vary for different time periods, is known to central computer system 30 (e.g., stored in a database) or communicated by a system linked to central computer system 30 or by meter transceiver 60.

To pay the parking fees, the user swipes a debit, credit, prepaid, or identification card through card slot 113 and the account or identification information is read and preferably encrypted by processor 101, in step 726. The encrypted account or identification information is transmitted by transmitter 15 to central computer system 30 via transponder 20 (if provided), in step 728. Where a user identification or prepaid parking fee card is used, the card may still be swiped through slot 113 with relevant identification, payment information, or both transmitted to central computer system 30. In other embodiments, a card may not be needed, but rather only a username, password, personal identification number (PIN) or both, input via keypad 110.

Figure 7A:
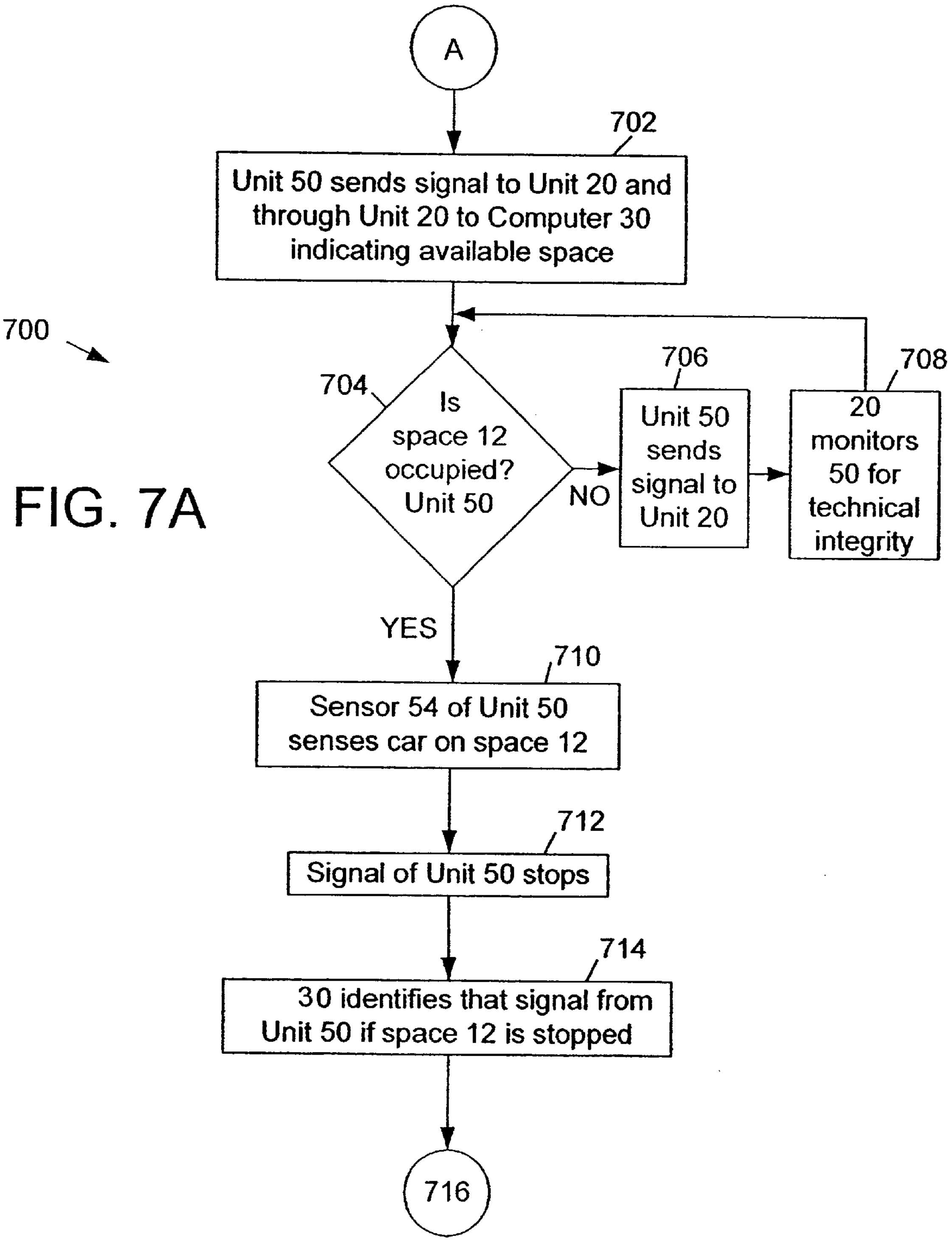
FIG. 7A through FIG. 7D provide a flow chart of a method used with the system of FIG. 1A.
Figure 7B:
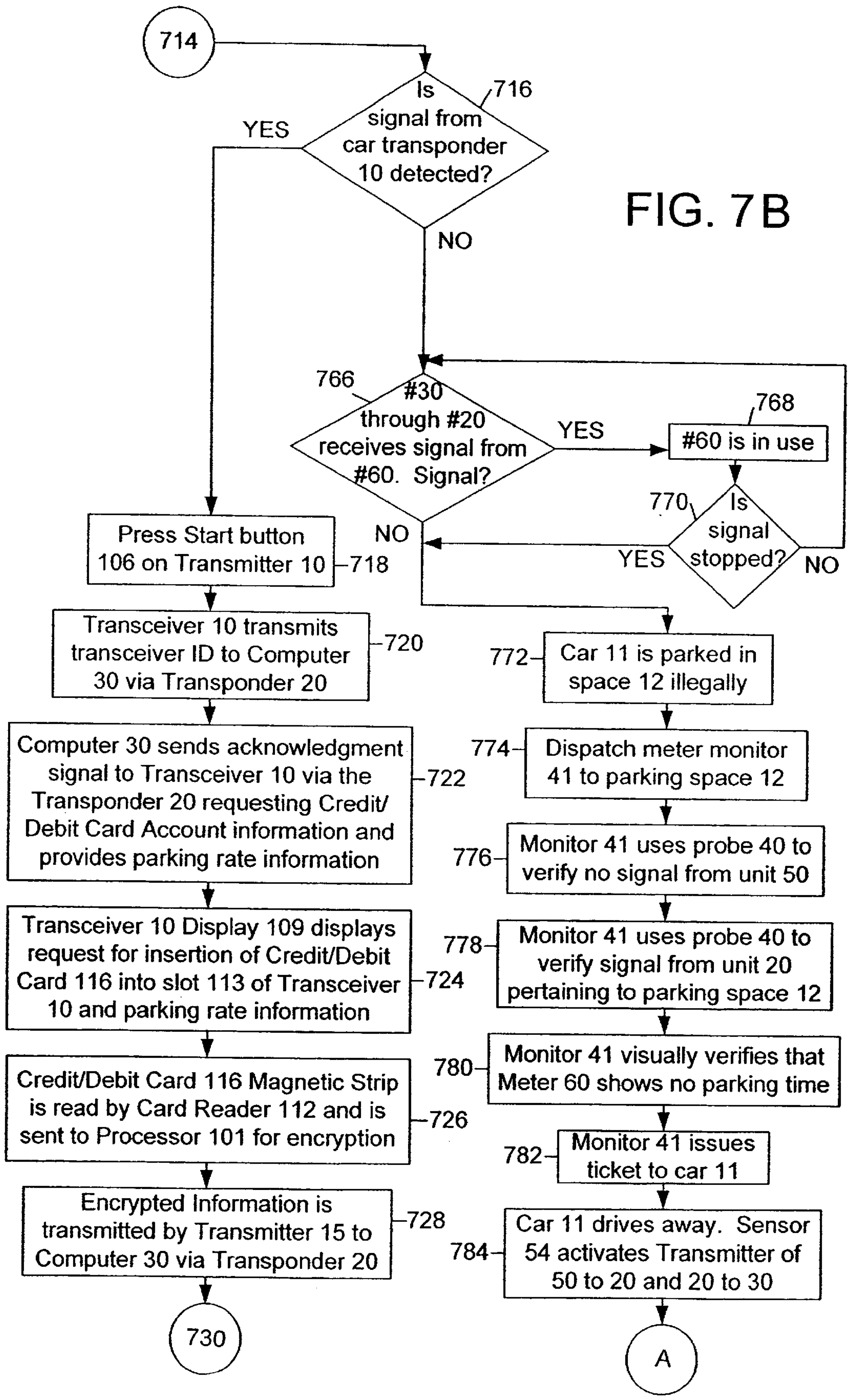
Figure 7C:
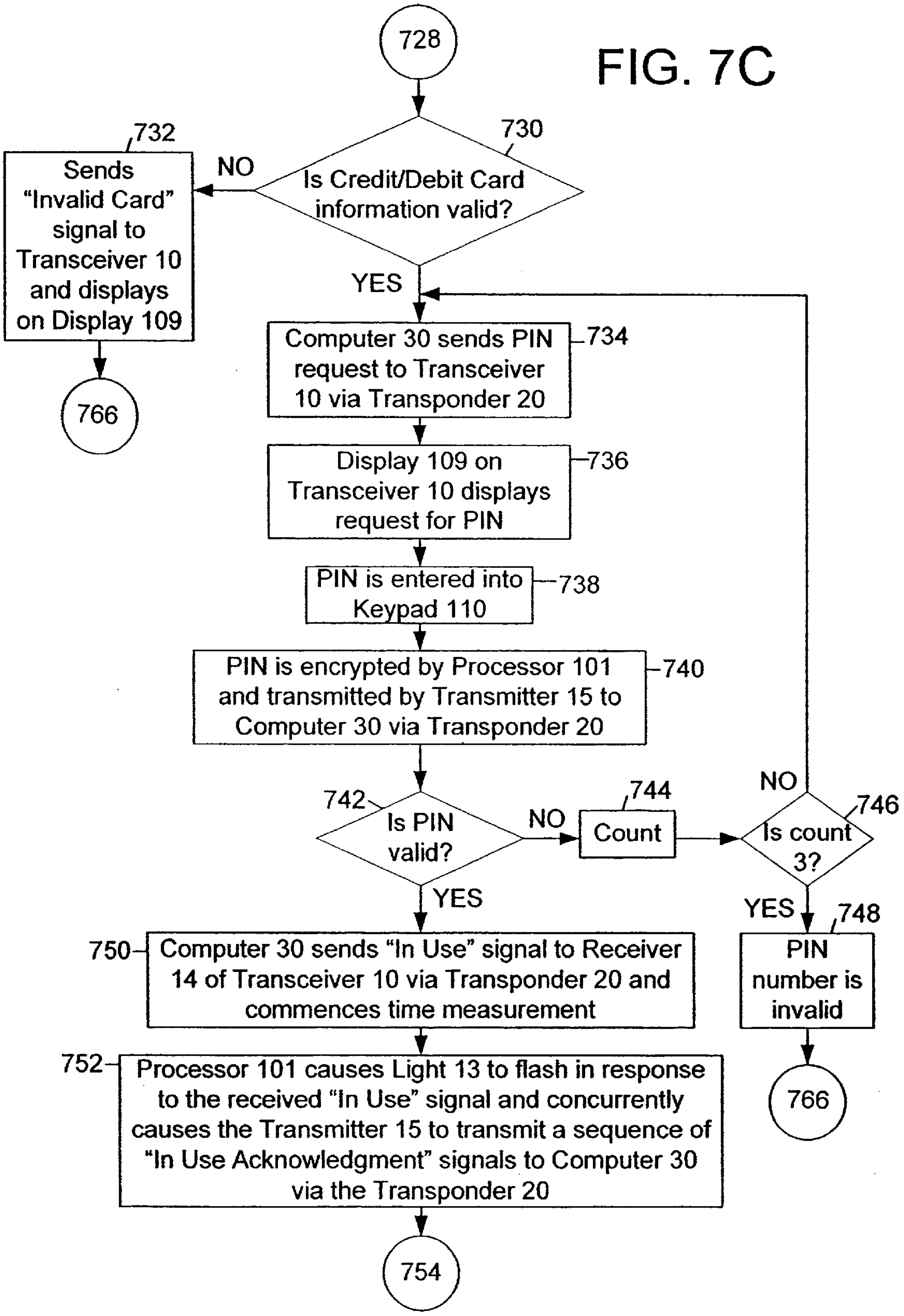
Figure 7D:
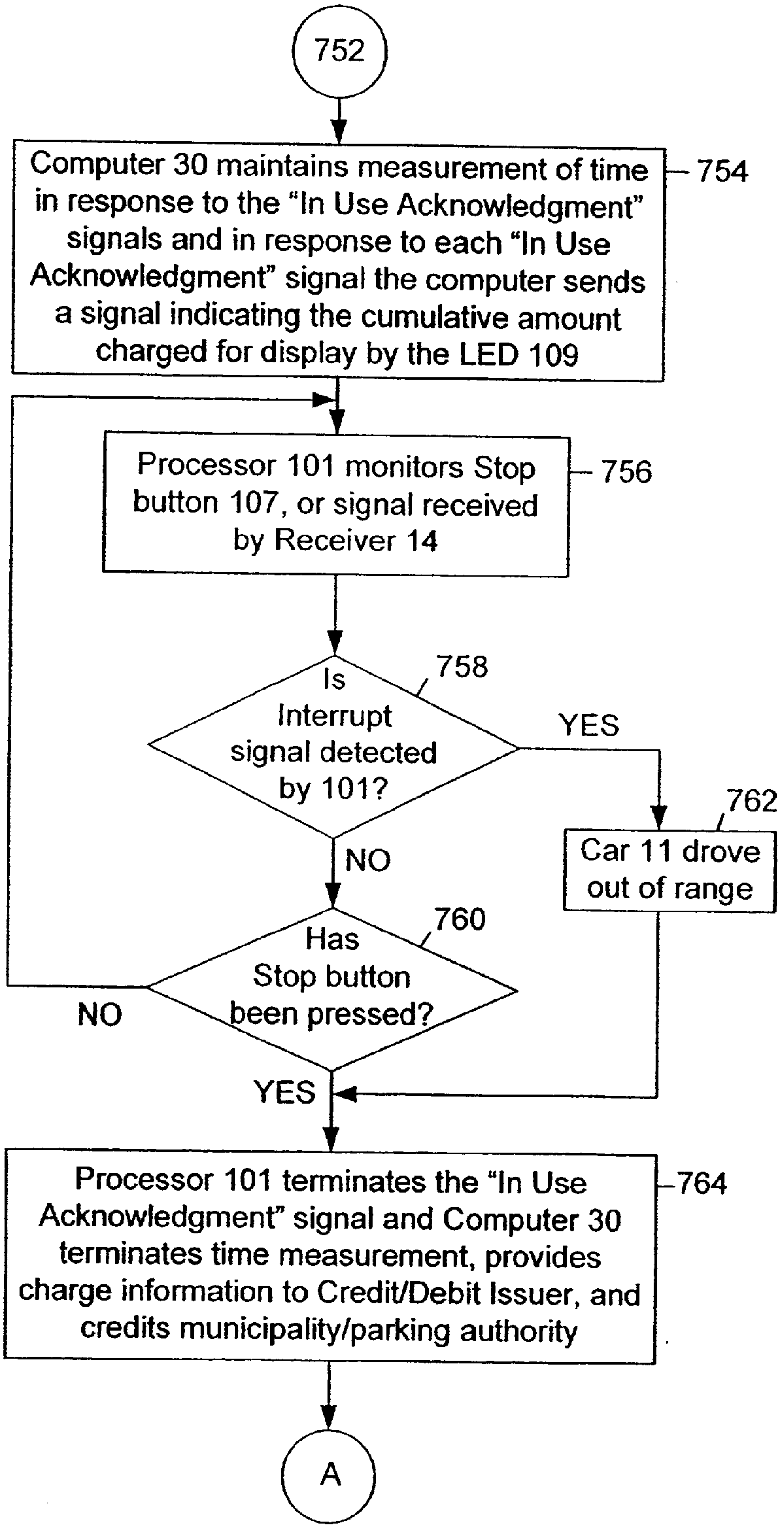

Referring to FIG. 7C, in step 730, assuming a card 116 was used, a determination is made by central computer system 30 of whether the received, and decrypted, debit card, credit card, prepaid card, or identification information is valid by, for example, querying a third party debit or credit issuer system to facilitate payment of parking fees. If the information can not be confirmed as valid, central computer system 30 transmits an "invalid card" message to receiver 14 of portable transceiver 10, in step 732. The "invalid card" message is displayed in display 109 of portable transceiver 10. The process then returns to step 766 of FIG. 7B to determine if the timer has expired. If the account information or user identification information is determined to be valid, in step 734, the central computer system 30 sends a PIN request to portable transceiver 10, which is displayed in display 109, in step 736.

Using keypad 110, the user enters a PIN, in step 738, which is encrypted and transmitted to central computer system 30, in step 740. As previously mentioned, if the user has pre-paid credits managed by central computer system 30, swiping of a credit or debit card would not be needed, although a user or vehicle identification may still be required. In step 742, determination of the validity of the PIN is made by central computer system 30. This is done by comparing the PIN with a database of PINs associated with specific transceivers, users, vehicles, or some combination thereof accessed by central computer system 30. Preferably, if the PIN is determined not to be valid, a counter is started, in step 744, and the user is given three chances, in step 746, to enter the correct PIN, as an example. If unsuccessful, the PIN is determined to no longer be valid, in step 748, and the process returns to step 766 of FIG. 7B to determine if the timer has expired.

If the PIN is determined to be valid, in step 742, central computer system 30 sends, for example, an "in use" message to receiver 14 of portable transceiver 10 and commences time measurement, in step 750. In response, in step 752, processor 101 causes a light 120 (e.g., an LED) to be lit or to flash and portable transceiver 10 transmits a sequence of "in use acknowledgement" signals (or authorization signals) to central computer system 30. Preferably, in response to receipt of each "in use acknowledgment" signal, or periodically during use, at the conclusion of use, or upon request, central computer system 30 sends a signal to portable transceiver 10 indicating the cumulative amount charged, which is shown in display 109, in step 754 of FIG. 7D.

When payment is required, central computer system 30 continues to charge fees so long as the user has not terminated the session, or if the meter goes into an "off" state where it no longer requires payment of parking fees for use. At the portable transceiver 10, the processor 101 continues to monitor stop button 107 and receiver 14 to determine whether the portable transceiver 10 should cease sending the "in use acknowledgement" or authorization signal, in step 756. If an interrupt signal is detected, in step 758, processor 101 determines if the interrupt signal was generated because vehicle 11 drove out of range, in step 762, or whether stop button 107 was depressed, in step 760. Either case causes the charges or consumption of credits associated with the user of portable transceiver 10 to be terminated and processor 101 ceases sending the "in use acknowledgement" authorization signal to central computer system 30, in step 764. And, the final accumulated charges are communicated to the debit or credit card issuer and the municipality or private owner of the monitored parking space is paid the accumulated parking fees. In the case of a prepaid card, the prepaid card is debited to pay the municipality or private owner of the monitored parking space. The process then returns to connector A of FIG. 7A, where the parking status and control system awaits the next vehicle.

As briefly discussed above, in other embodiments, rather than debiting or charging the payment amount, the user may purchase, or have previously purchased, parking credits. The parking credits may be stored in an account at central computer system 30 or a system linked thereto and used when a valid PIN, transceiver ID, user identification, vehicle identification, or some combination thereof are received, as described above. Optionally, credits could be is "loaded on" portable transceiver 10 and transferred to central computer system 30 to pay parking fees. The parking status control system may also be configured such that the user can buy parking credits, using a debit or credit card, as discussed above, or may be able to purchase a prepaid parking fee card with credits stored thereon for use with either of portable transceiver 10 or meter 65. In these various embodiments, the system may be configured such that a user can establish a cap limit on the parking fees to be charged to a credit or debit card or on the credits to be used. For persons or vehicles that are not to be charged parking fees, receipt of the transceiver ID, PIN, group identification, user identification, vehicle identification or some combination thereof by central computer system 30 may be sufficient to authorize use of parking space 12 via portable transceiver 10 and, if included, meter 65.

Returning to step 766 of FIG. 7B, if an authorization signal from meter 65 was not received, and a portable transceiver 10 signal was not received in step 716, central computer system 30 designates vehicle 11 as illegally parked, in step 772. Upon such designation, or shortly thereafter, central computer system 30 generates a space (or meter) violation signal. The violation signal includes an identification or location, or both of parking space 12, meter 65 or both. Central computer system 30 may transmit the meter violation signal to transceiver 60 of meter 65 to place meter 65 in an alarm state, wherein a red light of meter 65 may flash in response to the violation signal. In the preferred embodiment, in step 774, a meter monitor 41 is dispatched to parking space 12 and meter 65 (if provided).

Meter monitor 41 may be equipped with portable meter monitor device 40, as previously described, configured to probe in-ground detector 50 and transponder 20 (if provided) to verify that they are operating properly, in steps 776 and 778. A visual inspection of meter 65 may be accomplished to ensure there is no time left on the meter, in step 780. If everything is working properly and the paid for time on portable transceiver 10 or meter 65 has expired, meter monitor 41 issues a ticket to vehicle 11, in step 782. Once vehicle 11 vacates parking space 12, in step 784, in-ground detector 50 detects the vacancy and reestablishes communication with central computer system 30 and returns to connector A of FIG. 7A and awaits the next vehicle.

In the event that central computer system 30 stops receiving an authorization signal while vehicle 11 is still present in parking space 12, a timer may be started that gives the user a period of time (e.g., 5 minutes), to have a new authorization signal provided to central computer system 30. In such a case, if central computer system 30 has determined that parking space 12 is occupied beyond the grace period without receipt of an authorization signal from meter transceiver 60 or portable transceiver 10 central computer system 30 designates parking space 12 to be in an unauthorized use or illegally occupied state, as in step 772 of FIG. 7B, and the process proceeds as discussed above.

Authorization may be ceased after commencement in any of a variety of manners. This situation can occur if portable transceiver 10 runs out of prepaid parking credits or an account that is being charged or debited to pay for parking ceases to allow such charges or debits. If central computer system 30 accesses a debit or credit account associated with the user (or vehicle) of portable transceiver 10 or meter 65 (if provided), and the funds in that account are exhausted or not available, central computer system 30 will no longer be in receipt of an authorization signal. In the case of meter 65, user inserted currency may be used up, causing meter transceiver 60 to cease transmission of the authorization signal. If meter 65 was satisfied using credits associated with the portable transceiver 10 or associated with a prepaid parking card, and those credits were consumed, meter transceiver 60 would no transmit an authorization signal.

FIG. 8 shows an alternative embodiment to those shown in FIG. 1A through FIG 1C. In this embodiment, meters 65' and 65" are modified forms of meter 65 of FIG. 1A. Instead of in-ground detectors, vehicle presence detectors are mounted to the meters 65' and 65". Vehicle presence detectors 52A–52D each monitor a parking space. Vehicle presence detector 52B monitors parking space 12 and vehicle presence detector 52C monitors parking space 13. Like in-ground detector 50, vehicle presence detectors 52A–52D may be configured to detect the presence or absence of a vehicle in any of a variety of manners. The vehicle presence detectors are linked via communication path 36.

Also, in FIG. 8, rather than pole mounted transponder 20, a transponder is coupled to each meter device. That is, transponder 20' is mounted to meter 65' and transponder 20" is mounted to meter 65". Although, there need not be a transponder coupled to every meter, since multiple meters, linked via communication path 36, could use the same transponder. As is shown, like the vehicle presence detectors 52A–52D, transponders 20' and 20" are coupled to communication path 36. Meter transceivers 60' and 60" are also coupled to communication path 36. However, transponders 20' and 20" communicate by wireless means with central computer system 30 in this embodiment, for example via a link including satellite 34. Signals communicated between the transponders 20' and 20" and central computer system 30 are substantially those already discussed (e.g., authorization signals).

FIG. 9 shows yet a different embodiment of a parking status control system in accordance with the present invention. In this embodiment, vehicle presence detectors are mounted to a curb 17. Vehicle presence detector 51A monitors parking space 12 and vehicle presence detector 51B monitors parking space 13. Vehicle presence detectors 51A and 51B are coupled via communication path 36 (e.g., copper wire, coax cable, or fiber optic cable). Transponder 20'" is a pole mounted transponder, mounted curbside and also coupled to communication path 36. Therefore, signals indicative of the presence or lack of a vehicle are communicated to transponder 20'" via wired means in this embodiment. However, transponder 20' communicates by wireless means to central computer system 30, such as by a link that includes satellite 34.

FIG. 10 shows an embodiment wherein vehicle presence detectors 51A and 51B are mounted to wall 1000. Such an implementation may be useful in a parking garage setting, or in a public meter parking space setting. Vehicle presence detector 51A monitors the space 12 and vehicle presence detector 51B monitors space 13. Once vehicle presence detector 51A detects vehicle 11, the corresponding signal may be communicated to central computer system 30 via communication means 32. A meter 65A, substantially similar to meter 65 may also be included. Meter 65A may also communicate with central computer system 30 via communication means 32. Additionally, a receiver (or a transponder) may also be included to facilitate receipt of an authorization signal by a portable transceiver 10. Such a receiver may be integral with the vehicle presence detectors or meters, or may be separate modules.

In some embodiments, a transceiver, whether a portable transceiver of meter transceiver, may be configured to read information from a magnetic card to generate a authorization signals. In other embodiments, the transceiver may be configured to read bio-information, for example, through retinal scans, hand or fingerprint scans, facial recognition and so on. Such types of bio-information scanning and receivers exist in the art, so are not discussed in detail herein.

In some embodiments, the parking status control system may include functionality that assists a user in finding a vacant parking space, whether in a parking garage or for public parking spaces. In such a case a link to a GPS system module may be integral with the portable transceiver, central computer system, or both. Given information in the central computer system's 30 databases, unoccupied spaces can be determined and uniquely identified. With GPS, the location of the portable transceiver 10 can be determined. Since the location of vacant spaces is also known, the GPS module can determine the closest parking space to the portable transceiver, and provide directions if needed. Additionally, if the user enters an address (or landmark) into the portable transceiver (assuming appropriate input means are included), the parking status control system can determine the closest available space to the entered address. As yet another option, the parking status control system may be configured to reserve such spaces for a user of the portable transceiver. In such a case, the meter may display a "RESERVED" of "IN USE" messages.

The invention may be embodied in other specific forms without departing from the spirit or central characteristics thereof. For example, the various components may be implemented in private parking garages to ensure proper parking and facilitate payment of associated parking, or garage entrance, fees. The present embodiments are therefore to be considered in all respects as illustrative and not restrictive, the scope of the invention being indicated by appending claims rather than by the foregoing description, and all changes that come within the meaning and range of equivalency of the claims are therefore intended to be embraced therein.

What is claimed is:

1. An automated parking space monitoring system configured to monitor a plurality of parking spaces, said monitoring system comprising:

A. a database comprising a unique space identification associated with each of said parking spaces;

B. a plurality of vehicle presence detectors, wherein each vehicle presence detector is configured to provide an indication of the presence of a vehicle in an associated one of said parking spaces;

C. one or more transceivers configured to generate an authorization signal as a function of a set of valid inputs;

D. a communication means, associated with one or more of said parking spaces and configured to receive:

1) vehicle presence indications from a corresponding set of vehicle presence detectors; and 2) authorization signals from said transceivers; and E. a controller coupled to said database and said communication means, said controller configured to selectively authorize use of an occupied space, from said plurality of parking spaces, as function of:

1) a space identification corresponding to said occupied space;

2) a vehicle presence indication associated with said occupied space; and 3) an authorization signal associated with said occupied space, wherein said communication means includes at least one of a wireless communication link or a wired communication link.

2. A system in claim 1, wherein said communication means includes one or more of:

a) Internet;

b) World Wide Web;

c) intranet;

d) extranet;

e) virtual private network;

d) cellular network;

e) telephone network;

f) fiber optic network;

g) cable network;

h) satellite network; and i) GPS link.

3. A system as in claim 1, wherein said transceiver includes:

1) a card reader, as an input means of at least some of said valid inputs, wherein said card reader is configured to read one or more of a magnetic card, credit card, a debit card, a prepaid parking card having parking credits stored thereon, or an identification card, including a user identification or a vehicle identification card.

4. A system as in claim 1, wherein said transceiver is a portable transceiver.

5. A system as in claim 1, wherein said transceiver is a meter transceiver.

6. A system as in claim 1, wherein said parking space is a space chosen from a group comprising:

a) publicly metered spaces;

b) assigned parking garage spaces; and c) unassigned parking garage spaces.

7. A system as in claim 1, wherein said transceivers include an output means and said controller is further configured to selectively communicate messages to said transceivers, wherein said messages are output at said output means.

8. A system as in claim 7, wherein said output means includes a display and said messages include alert messages rendered via said display.

9. An automated parking space monitoring system configured to monitor a plurality of parking spaces, said monitoring system comprising:

A. a database comprising a unique space identification associated with each of said parking spaces;

B. a plurality of vehicle presence detectors, wherein each vehicle presence detector is configured to provide an indication of the presence of a vehicle in an associated one of said parking spaces;

C. one or more transceivers configured to generate an authorization signal as a function of a set of valid inputs;

D. a communication means, associated with one or more of said parking spaces and configured to receive:

1) vehicle presence indications from a corresponding set of vehicle presence detectors; and 2) authorization signals from said transceivers; and E. a controller coupled to said database and said communication means, said controller configured to selectively authorize use of an occupied space, from said plurality of parking spaces, as function of:

1) a space identification corresponding to said occupied space;

2) a vehicle presence indication associated with said occupied space; and 3) an authorization signal associated with said occupied space, wherein said controller is further configured to generate a violation signal as a function of said vehicle presence indication and the absence of said authorization signal.

10. A system as in claim 9, wherein said controller is further configured to communicate said violation signal to one or more enforcement systems via a network.

11. A system as in claim 9, wherein said controller is further configured to communicate said violation signal to a user device via a network, said user device chosen from a group of devices including:

a) an e-mail device;

b) a personal computer;

c) a personal digital assistant;

d) a telephone; and e) a pager.

12. An automated parking space monitoring system configured to monitor a plurality of parking spaces, said monitoring system comprising:

A. a database comprising a unique space identification associated with each of said parking spaces;

B. a plurality of vehicle presence detectors, wherein each vehicle presence detector is configured to provide an indication of the presence of a vehicle in an associated one of said parking spaces;

C. one or more transceivers configured to generate an authorization signal as a function of a set of valid inputs;

D. a communication means, associated with one or more of said parking spaces and configured to receive:

1) vehicle presence indications from a corresponding set of vehicle presence detectors; and 2) authorization signals from said transceivers; and E. a controller coupled to said database and said communication means, said controller configured to selectively authorize use of an occupied space, from said plurality of parking spaces, as function of:

1) a space identification corresponding to said occupied space;

2) a vehicle presence indication associated with said occupied space; and 3) an authorization signal associated with said occupied space, wherein said controller includes an interface with the Internet and includes means to communicate information and messages from the Internet and World Wide Web to and from said transceiver.

13. A system as in claim 12, wherein said transceiver is a portable transceiver.

14. A system as in claim 12, wherein said transceiver is a meter transceiver.

15. A monitor device, for use with a parking space monitoring system configured to selectively authorize use of uniquely identified parking spaces, said parking space monitoring system including a set of vehicle presence detectors associated with said parking spaces and one or more transceivers, each transceiver configured to generate a space-specific authorization signal for a given one of said parking spaces, wherein said parking space monitoring system is further configured to generate a space-specific violation signal in response to the presence of a vehicle in said parking space and absence of said authorization signal, said monitor device comprising:

A. a processor coupled to a storage device and a power source;

B. a receiver coupled to said processor and configured to receive said violation signal; and C. a set of output mechanisms coupled to said processor and configured to output signals indicative of receipt of said violation signal, wherein said output device includes a display configured to render an indication of said parking space corresponding to said violation signal.

16. A monitor device as in claim 15, wherein said meter monitor device is a portable handheld device.

17. A monitor device as in claim 15, wherein said meter monitor device is integral with a vehicle.

18. A monitor device as in claim 15, wherein in response to receipt of a plurality of space-specific violation signals, said monitoring device is further configured to output a route comprised of a plurality of indications of parking spaces corresponding to said plurality of space-specific violation signals.

19. A monitor device as in claim 18, further including a GPS link and a module to generate said route.

20. A monitor device as in claim 15, wherein each vehicle presence detector is configured to provide an indication of the presence of a vehicle in an associated one of said parking spaces, and wherein said meter monitor device further includes:

D. a vehicle presence detector probe module, including a set of vehicle presence detector diagnostic signal generation logic, configured to probe a vehicle presence detector and to determine, as a function of said diagnostic logic, if said probed vehicle presence detector is operating properly.

21. A monitor device as in claim 15, wherein said parking space monitoring system includes a central computer system and at least one of said vehicle presence detectors or transceivers is configured to communicate with said central computer system via a transponder, and wherein said monitor device further includes:

D. a transponder probe module, including a set of transponder diagnostic signal generation logic, configured to probe a transponder and to determine, as a function of said diagnostic logic, if said probed transponder is operating properly.

22. A monitor device as in claim 15, wherein at least some of said transceivers are integral with parking meters, and wherein said monitor device further includes:

D. a meter probe module, including a set of meter diagnostic signal generation logic, configured to probe a meter and to determine, as a function of said diagnostic logic, if said probed meter is operating properly.

23. A portable transceiver, for use with a parking space monitoring system configured to selectively authorize use of a parking space, from a database of uniquely identified parking spaces, said portable transceiver comprising:

A. a processor coupled to a storage device and a power source;

B. a set of user input devices, configured to facilitate entry of a set of valid inputs, said valid inputs including at least one of an identification of a user, an identification of said transceiver, or parking credit, credit, or debit account information;

C. a signal generator configured to generate an authorization signal as a function of said set of valid inputs, wherein said authorization signal and a vehicle presence indication from a space oriented vehicle detector are required by said parking space monitoring system to authorize use of said parking space; and D. a transmitter configured to transmit said authorization signal in response to manipulation, said transmission via a communication means that includes a wireless path.

24. A portable transceiver as in claim 23, wherein said portable transceiver is configured to store parking credits, wherein said authorization signal includes indicia of parking credits and said controller is configured to apply said parking credits to pay fees associated with said occupied parking space.

25. A portable transceiver as in claim 23, wherein said transceiver includes, as one of said user input devices:

E. a card reader configured to read one or more of a magnetic card, credit card, a debit card, a prepaid parking card having parking credits stored thereon, or an identification card, including a user identification, a vehicle identification card, or both.

26. A portable transceiver as in claim 23, wherein and said set of valid inputs includes a PIN, and said transceiver includes, as one of said user input devices, a keypad configured to facilitate entry of said PIN.

27. A portable transceiver as in claim 23, wherein said transceiver includes, as one user input devices, a keypad configured to facilitate entry of text messages.

28. A portable transceiver as in claim 23, further including:

F. a display, configured to render one or more of text, video, or graphic messages.

29. A portable transceiver as in claim 28, wherein said transceiver includes a link to the Internet and said messages include messages from at least one of the Internet and World Wide Web and said transceiver further includes one or more output devices configured to output said messages.

30. A portable transceiver as in claim 23, further configured to output an indication of a vacant parking space.

31. A portable transceiver as in claim 23, wherein said transceiver is integral with at least one of an e-mail device, a cellular telephone, a toll token, a GPS module, or a personal digital assistant.

32. A portable transceiver as in claim 23, wherein said communication means includes one or more of:

a) Internet;

b) World Wide Web;

c) intranet;

d) extranet;

e) virtual private network;

d) cellular network;

e) telephone network;

f) fiber optic network;

g) cable network;

h) satellite network; and i) GPS link.

33. A parking meter associated with at least one parking space, for use with a parking space monitoring system including vehicle presence detectors associated with a plurality of uniquely identified parking spaces represented in a database, said parking space monitoring system configured to selectively authorize use of said parking spaces, said parking meter comprising:

A. a meter transceiver, including:

1) a processor coupled to a storage device and a power source;

2) a signal generator configured to generate an authorization signal as a function of a set of valid inputs, wherein said authorization signal and a vehicle presence indication from a corresponding vehicle presence detector are required by said parking space monitoring system to authorize use of said parking space; and 3) a communication means configured to transmit said authorization signal via a network;

B. a set of user input devices, configured to facilitate entry of at least some of said set of valid inputs, said set of valid inputs including at least one of an identification of a user, an identification of said transceiver, or parking credit information, credit account information, or debit account information; and C. a set of output devices, configured to present output information.

34. A meter device as is claim 33, wherein said network includes at least one satellite link.

35. A meter as is claim 33, further including, as one of said user input devices:

D. a card reader configured to read one or more of a magnetic card, credit card, a debit card, a prepaid parking card having parking credits stored thereon, or an identification card, including a user identification or a vehicle identification card.

36. A meter as is claim 33, wherein and said set of valid inputs includes a PIN, and said meter includes, as one of said user input devices, a keypad configured to facilitate entry of said PIN.

37. A meter as is claim 33, wherein said meter includes, as one of said user input devices, a keypad configured to facilitate entry of text messages.

38. A meter as in claim 33, wherein one of said output devices is a display, configured to render one or more of text, video, and graphic messages.

39. A meter as in claim 33, wherein said communication means includes a link to the Internet and said output information includes messages from at least one of the Internet and World Wide Web.

40. A meter as in claim 33, wherein said output information includes information related to authorization to use or availability of said parking space.

41. A method of monitoring a plurality of parking spaces, said method comprising:

A. detecting with a vehicle presence detector a vehicle in an occupied space, from said plurality of parking spaces, and generating a vehicle presence indication corresponding to said occupied space;

B. generating with a transceiver an authorization signal as a function of a set of valid inputs; and C. communicating said vehicle presence indication and said authorization signal via one or more communication means to a controller that is coupled to a database comprising a unique space identification associated with each of said parking spaces; and D. authorizing, by said controller, use of said occupied parking space as a function of a space identification corresponding to said occupied space and said vehicle presence indication and said authorization signal.

42. A method as in claim 41, wherein said transceiver is a portable transceiver.

43. A method as in claim 41, wherein said transceiver is a meter transceiver.

44. A method as in claim 41, further comprising:

E. generating by said controller a violation signal as a function of the presence of said vehicle presence indication and the absence of said authorization signal.

45. A method as in claim 41, wherein said parking space is a space chosen from a group comprising:

a) publicly metered spaces;

b) assigned parking garage spaces; and c) unassigned parking garage spaces.

* * * * *